(12) United States Patent
Chuang et al.

(10) Patent No.: US 8,903,989 B2
(45) Date of Patent: Dec. 2, 2014

(54) ADJUSTABLE SERVER-TRANSMISSION RATES OVER FIXED-SPEED BACKPLANE CONNECTIONS WITHIN A MULTI-SERVER ENCLOSURE

(75) Inventors: Mike Chuang, Austin, TX (US); Charles L. Hudson, Round Rock, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 482 days.

(21) Appl. No.: 12/937,693

(22) PCT Filed: Apr. 28, 2008

(86) PCT No.: PCT/US2008/005455
§ 371 (c)(1),
(2), (4) Date: Oct. 13, 2010

(87) PCT Pub. No.: WO2009/134219
PCT Pub. Date: Nov. 5, 2009

(65) Prior Publication Data
US 2011/0029669 A1   Feb. 3, 2011

(51) Int. Cl.
*G06F 15/173* (2006.01)
*G06F 15/16* (2006.01)
*H04L 12/801* (2013.01)
*H04L 12/825* (2013.01)
*H04L 12/26* (2006.01)

(52) U.S. Cl.
CPC ............ *H04L 47/10* (2013.01); *H04L 43/16* (2013.01); *H04L 43/0894* (2013.01); *H04L 47/266* (2013.01)
USPC ........... 709/224; 709/232; 709/233; 709/234; 709/235

(58) Field of Classification Search
None
See application file for complete search history.

(56) References Cited

U.S. PATENT DOCUMENTS

| 5,930,160 A | * | 7/1999 | Mahant-Shetti | ............ 708/603 |
| 7,161,907 B2 | * | 1/2007 | Mott | ............ 370/232 |

(Continued)

FOREIGN PATENT DOCUMENTS

| CN | 1459955 A | 12/2003 |
| CN | 1797976 | 7/2006 |

(Continued)

OTHER PUBLICATIONS

Li Miao1,2, Yin Bijun2, WangYuyan2, Duan Guodong2 (1. Dept. of Electronic Engineering, Shanghai Jiaotong University, Shanghai 200030; 2. East China Institute of Computer Technology, Shanghai 200233)—"Research and Realization of Flow Control in Ethernet Switch".*

(Continued)

*Primary Examiner* — Joshua Joo
*Assistant Examiner* — Younes Naji

(57) ABSTRACT

Embodiments of the present invention are directed to providing configurable transmission rates for devices within a multi-device enclosure, despite common communication media within the multi-device enclosure that would otherwise constrain or fix the transmission rates of the devices. In one embodiment of the present invention, implemented within a virtual-connect manager or other module or device contained in, or associated with, a multi-server enclosure, the virtual-connect manager provides an administrative or management interface through which each server can be assigned a maximum transmission rate. The virtual-connect manager then continuously monitors the transmission rates of servers and/or ports within servers in order to apply back pressure, or flow control, so that the servers and/or ports within servers do not exceed the configured maximum transmission rates.

17 Claims, 32 Drawing Sheets

(56) References Cited

U.S. PATENT DOCUMENTS

| | | | |
|---|---|---|---|
| 7,266,117 B1 * | 9/2007 | Davis | 370/363 |
| 7,305,492 B2 | 12/2007 | Vryers et al. | |
| 7,532,668 B2 * | 5/2009 | Suzuki | 375/239 |
| 7,564,785 B2 * | 7/2009 | Krishnamurthi et al. | 370/230 |
| 8,284,665 B1 * | 10/2012 | Aybay et al. | 370/235 |
| 2003/0152087 A1 * | 8/2003 | Shahoumian et al. | 370/401 |
| 2004/0267570 A1 * | 12/2004 | Becker | 705/2 |
| 2006/0084475 A1 * | 4/2006 | Ohkubo et al. | 455/562.1 |
| 2006/0190484 A1 | 8/2006 | Cromer et al. | |
| 2006/0206602 A1 * | 9/2006 | Hunter et al. | 709/223 |

FOREIGN PATENT DOCUMENTS

| | | | |
|---|---|---|---|
| CN | 1829952 | | 9/2006 |
| CN | 1855852 | | 11/2006 |
| CN | 1855852 A | * | 11/2006 |
| CN | 1972315 A | | 5/2007 |
| CN | 101056146 | | 10/2007 |
| CN | 101056146 A | * | 10/2007 |
| EP | 0817440 A2 | | 1/1998 |
| EP | 0963054 A1 | | 12/1999 |
| EP | 0817440 A3 | | 2/2001 |
| JP | 2008-054199 | | 3/2008 |
| WO | WO0131832 A1 | | 5/2001 |
| WO | WO2006024993 A1 | | 3/2006 |

OTHER PUBLICATIONS

International Search Report and Written Opinion, dated Dec. 19, 2008, 10 pages.
Chinese Search Report cited in Appl. No. 200880128904.5 dated Jul. 9, 20013; 3 pages.
Research and Realization of Flow Control in Ethernet Switch, Computer EngineeringNo. 13,vol. 33, Jul. 2007, 4 Pages.
Research and Realization of Flow Control in Ethernet Switch, Computer Engineering No. 13, vol. 33, Jul. 2007, 4 Pages.

* cited by examiner

US 8,903,989 B2

ADJUSTABLE SERVER-TRANSMISSION RATES OVER FIXED-SPEED BACKPLANE CONNECTIONS WITHIN A MULTI-SERVER ENCLOSURE

CROSS-REFERENCE TO RELATED APPLICATION

This application is a national stage application under 35 U.S.C. §371 of PCT/US2008/005455, filed 28 Apr. 2008.

TECHNICAL FIELD

The present invention is related to communication of servers within multi-server enclosures with external entities and, in particular, to a method and system for providing adjustable maximum transmission rates for servers and/or individual ports within servers to external entities.

BACKGROUND OF THE INVENTION

As the capabilities of individual computer processors, data-storage devices, and other computer components have geometrically increased, over the past 50 years, and the volumes of such components have significantly decreased, the traditional single-processor and single-mass-storage-device computer architecture is gradually being replaced by similarly-sized, but much more powerful multi-device enclosures, including disk arrays that incorporate multiple mass-storage devices in a single enclosure and blade systems that incorporate multiple servers, each server including one or more processors, within a single enclosure. Multi-component enclosures simply connections between components, provide an integrated approach to power supply and environmental regulation, and may provide useful virtual interfaces to abstract the individual components to external entities.

While multi-component enclosures often provide enormous advantages over similarly capable collections of individual-component devices, multi-component enclosures may, at times, constrain or restrict components within the multi-component enclosures in order to provide common internal and external interfaces to the individual components. For example, in order to facilitate interoperability of, and the ability to easily replace and substitute, server modules in a blade system, all the server modules may be connected to external communications media through a common backplane, which may limit that transmission rates of the servers modules to a common, fixed transmission rate, despite the ability of servers to support different transmission rates when directly connected to communications media. Designers, developers, vendors, and users of multi-device enclosures have recognized the need to re-enable inherent flexibilities and capabilities of components within multi-component enclosures limited by shared interfaces, and the need to provide additional flexibilities and capabilities for individual components, in order to increase the usability and flexibility of the multi-device enclosures as a whole.

SUMMARY OF THE INVENTION

Embodiments of the present invention are directed to providing configurable transmission rates for devices within a multi-device enclosure, despite common communication media within the multi-device enclosure that would otherwise constrain or fix the transmission rates of the devices. In one embodiment of the present invention, implemented within a virtual-connect manager or other module or device contained in, or associated with, a multi-server enclosure, the virtual-connect manager provides an administrative or management interface through which each server can be assigned a maximum transmission rate. The virtual-connect manager then continuously monitors the transmission rates of servers and/or ports within servers in order to apply back pressure, or flow control, so that the servers and/or ports within servers do not exceed the configured maximum transmission rates.

DETAILED DESCRIPTION OF THE INVENTION

One embodiment of the present invention is directed to a method and system for applying back pressure, or flow control, to servers within a multi-server enclosure or to individual ports of servers within a multi-server enclosure in order to control the maximum rate of transmission by the servers or ports to one or more communications media. Multi-server enclosures are first discussed in order to provide a context for a subsequent description of various embodiments of the present invention. In alternative implementations, various different maximum transmission rates can be configured and enforced. For example, the aggregate maximum transmission rate of each server to all communications media to which the server is connected may be configured and enforced. Alternatively, the aggregate maximum transmission rate of each server to all communications media of a class or type of communications medium to which the server is connected may be configured and enforced. Alternatively, the aggregate maximum transmission rate of individual ports within a server may be configured and enforced.

Figure 1:
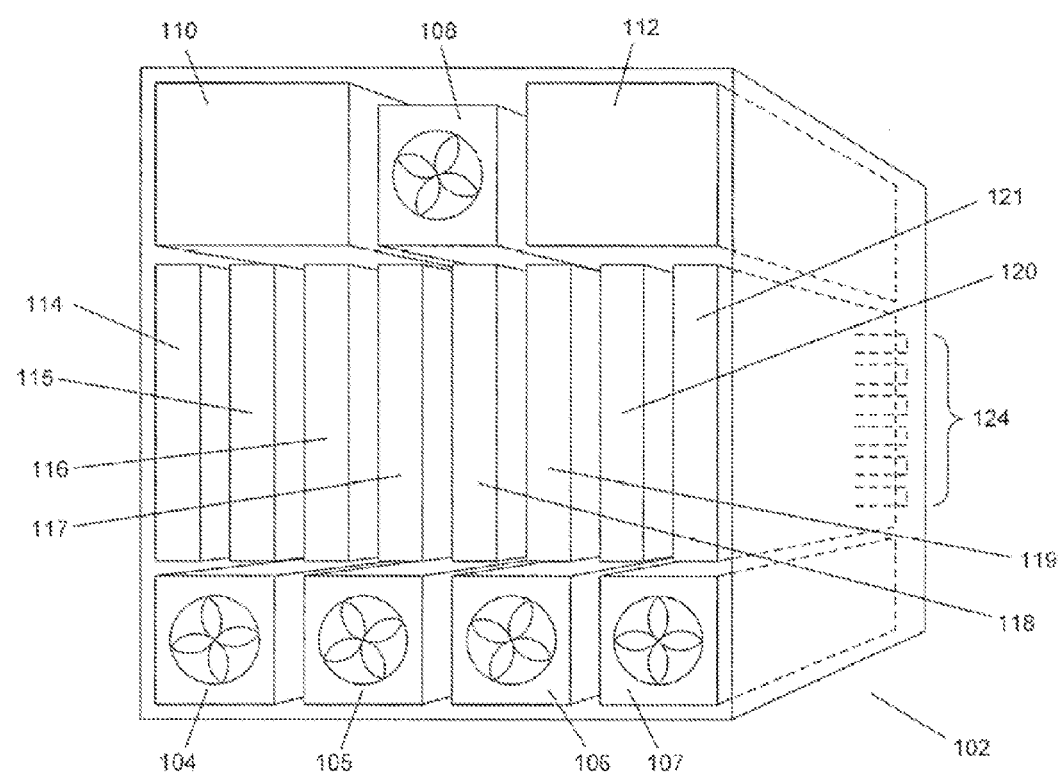
FIG. 1 illustrates major components of a multi-server blade system.

FIG. 1 illustrates major components of a multi-server blade system. The blade system 102 includes numerous temperature-control components 104-108, two or more power-supply units 110 and 112, multiple server modules 114-121, and a backplane 124 that includes multiple, different types of physical connections for interconnecting the server modules 114-121 and other components via power lines, control-signal lines, and various physical communications-media, including communications media for transferring data to, and receiving data from, external Ethernet, fiber channel, and other communications media. Of course, a blade system includes many other components, as well as management modules and management routines running within management modules to provide a management interface to blade-system administrators and to monitor and manage operation of the various components within the blade system.

Figure 2:
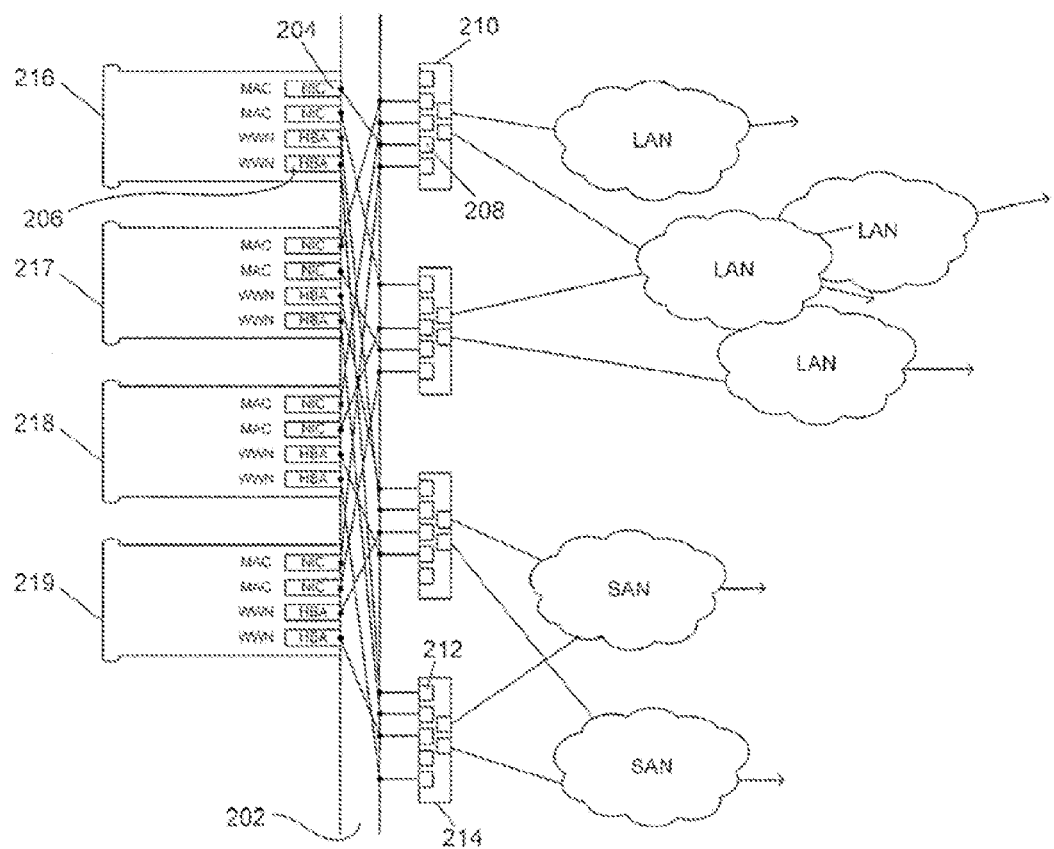
FIG. 2 illustrates the backplane of a blade system that provides signal-path connections between network-interface cards and host-bus adaptors.

FIG. 2 illustrates the backplane of a blade system that provides signal-path connections between network-interface cards and host-bus adaptors. In FIG. 2, the backplane 202 of the blade system provides signal-path connections between network-interface cards ("NICs") and host-bus adaptors ("HBAs"), such as NIC 204 and HBA 206, to ports within local-area-network ("LAN") and storage-area-network ("SAN") switches, such as port 208 in LAN switch 210 and port 212 in SAN switch 214, respectively. Each switch, such as switch 210, connects various network-interface cards or host-bus adaptors to one or more LANs or SANs. Each server 216-219 generally includes two or more NICs and two or more HBAs, so that the server can tolerate a NIC and/or HBA failure without losing connection to external LANs and/or SANs, respectively. Each NIC contains a manufacturer-supplied media-access control ("MAC") address and each HBA contains a world-wide name ("WWN"), respectively, by which the NICs and HBAs are addressed within the LANs and SANs, respectively. The backplane 202 is passive, providing signal lines that can be used to transmit signals between NICs and HBAs within servers and ports within LAN and SAN switches, including Ethernet and Fibre Channel switches. Server modules within a blade system plug into the backplane, through backplane connectors, so that bulky, error-prone wiring is not needed when server modules are installed into the blade system or when server modules are replaced or swapped.

Figure 3A:
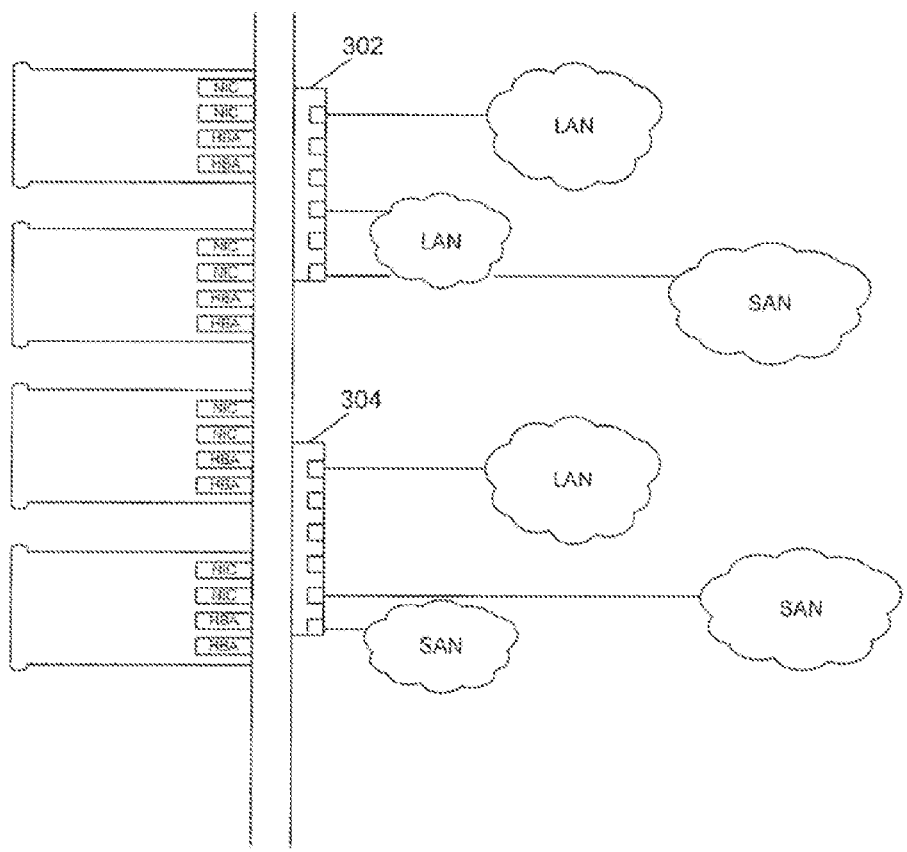
FIGS. 3A-B illustrate a virtual-connect-manager approach to interconnecting servers in a blade system to external communications media.
Figure 3B:
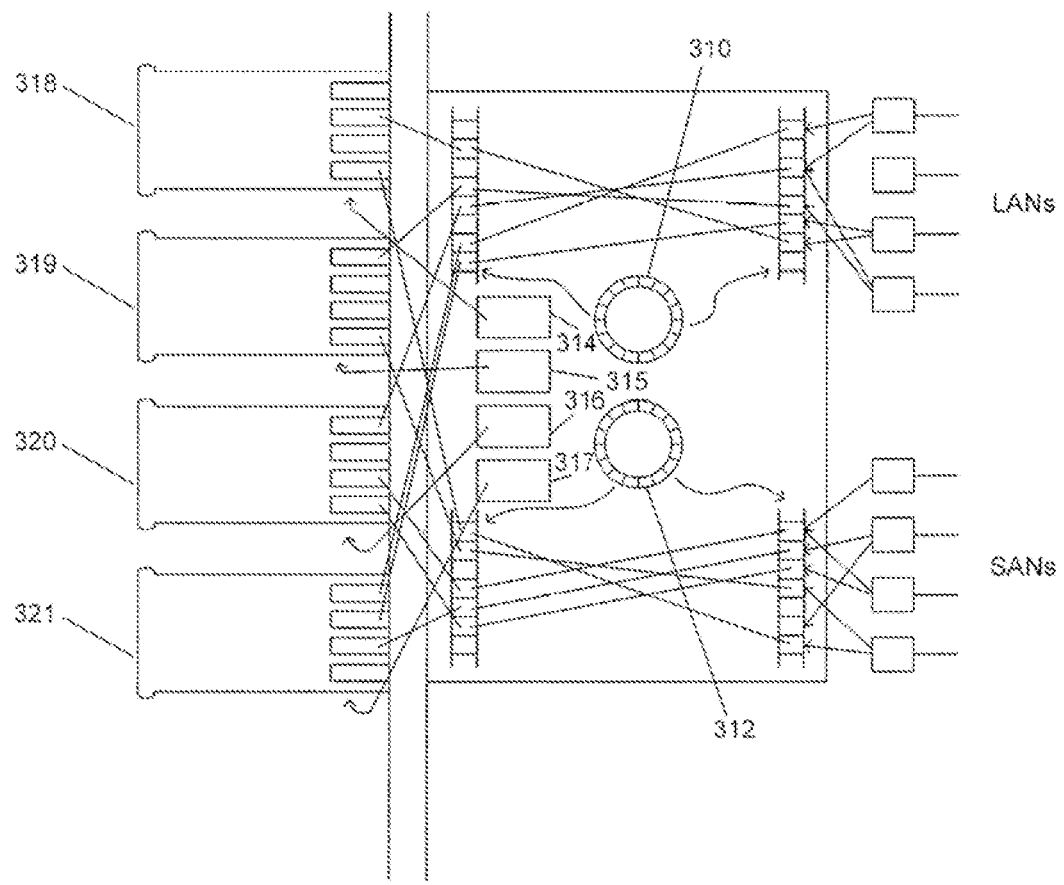

FIGS. 3A-B illustrate a virtual-connect-manager approach to interconnecting servers in a blade system to external communications media. As shown in FIG. 3A, rather than directly connecting NICs and HBAs of servers through the backplane directly to switches, the NICs and HBAs can alternatively be connected through the backplane to virtual-connect-manager modules 302 and 304, which are, in turn, connected to external communications media, including LAN and SAN communications media.

FIG. 3B illustrates functionality provided by a virtual-connect-manager module. The virtual-connect manager, running within a virtual-connect-manager module, maintains pools 310 and 312 of MAC, WWN, and other unique addresses for communications ports, one pool for each type of address. In FIG. 3B, the two pools 310 and 312 correspond to MAC addresses and WWN addresses. The virtual-connect manager also maintains a configuration profile 314-317 for each server 318-321. The virtual-connect manager, during an initialization phase, assigns MAC and WWN addresses from the pool of MAC and WWN addresses to the NIC and HBAs of all of the servers, replacing the manufacturer-supplied MAC and WWN addresses within the NICs and HBAs of each server. The MAC addresses and WWN addresses used by the virtual-connect manager are reserved by Ethernet and Fibre Channel consortiums for use in blade systems. The configuration profiles 314-317 contain information specifying the external LANs and SANs to which each NIC and HBA on each server are to be connected. The virtual-connect manager serves as a virtual interface between external LANs and SANs and NICs and HBAs within server modules of the blade system, as well as providing an administrator interface to communications management to blade-system administrators. By virtualizing the interface between external LANs and SANs and NICs and HBAs within server modules, the virtual-connect manager makes it possible to remove a server module and replace the removed server module with a new server module without needing to reconfigure those LANs and SANs to which the removed server module was connected and without needing to rewire the blade system or blade-system components. Instead, the virtual-connect manager, upon sensing power up of a replacement server, uses the configuration profile for that server to replace the MAC addresses and WWN addresses in the NIC and HBA cards of the replacement server with the MAC and WWN addresses used by the removed server, and to connect the newly installed server with those external LANs and SANs to which the removed server was previously connected.

Described embodiments of the present invention are related to Ethernet interconnections, and various aspects of Ethernet communications are next described. However, the approach represented by the present invention may be applied to additional types of communications media and protocols.

Figure 4A:
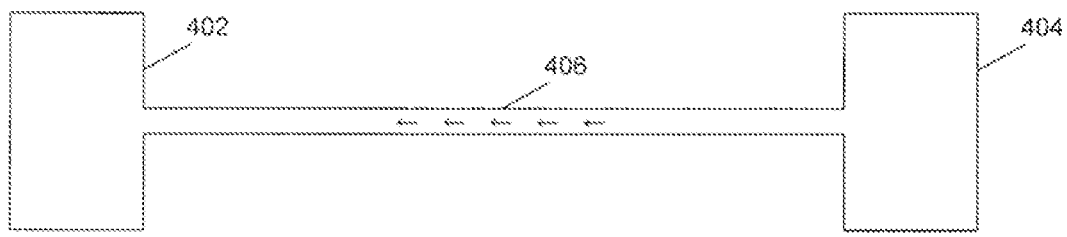
FIGS. 4A-C illustrate half-duplex and full-duplex operation of Ethernet-connected devices.
Figure 4B:
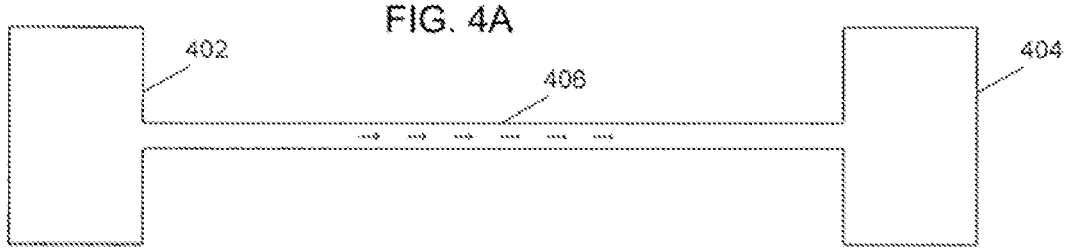
Figure 4C:
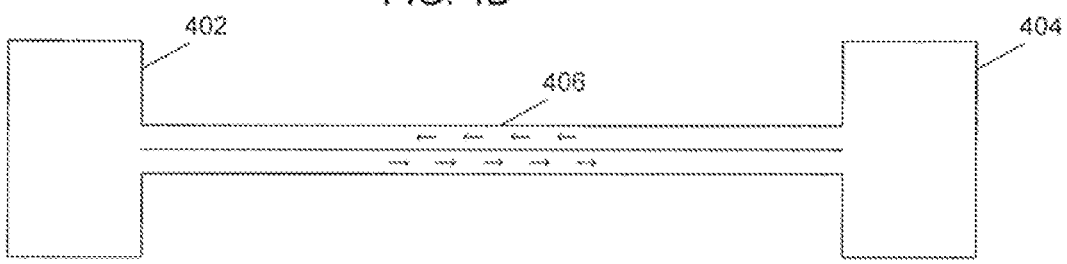

FIGS. 4A-C illustrate half-duplex and full-duplex operation of Ethernet-connected devices. FIGS. 4A-C use illustration conventions, again used in subsequent figures, in which two devices 402 and 404 that each includes a NIC connected to an Ethernet physical link transmit and receive data-encoding signals through the physical link. FIGS. 4A-B illustrate half-duplex operation of the Ethernet. In FIG. 4A, device 404 transmits data to device 402, and, in FIG. 4B, device 402 transmits information to device 404 through the physical link. In half-duplex operation, both devices cannot simultaneously transmit data. By contrast, in full-duplex operation, illustrated in FIG. 4C, devices 402 and 404 are simultaneously transmitting and receiving data through the physical link 406. Depending on the type and operational speed of an internet connection, 8-bit, 16-bit, or 32-bit data values are transmitted per clock cycle through the physical medium. These data values are obtained, on the transmission side, by de-assembling a packet of data stored in memory, and are re-assembled, on the receiving side, to reconstitute the packet and store the packet in memory.

Figure 5:
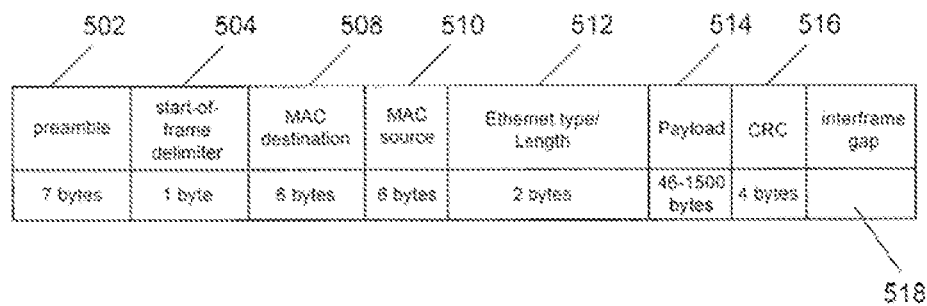
FIG. 5 illustrates a typical Ethernet-II packet.

FIG. 5 illustrates a typical Ethernet-II packet. The packet includes a 7-byte preamble 502, a start-of-frame deliminator 504, a 6-byte MAC destination address 508 of the NIC to which the packet is directed, a 6-byte MAC source address 510 of the NIC from which the packet is transmitted, a 2-byte Ethernet type/length field 512, a data-payload field comprising 46 to 1500 bytes 514, and a 4-byte CRC field 516 that provides for detection and correction of errors that occur during transmission of the packet. On the physical link, the data values corresponding to each packet are separated by an interframe gap 518 comprising a fixed number of clock cycles.

Figure 6:
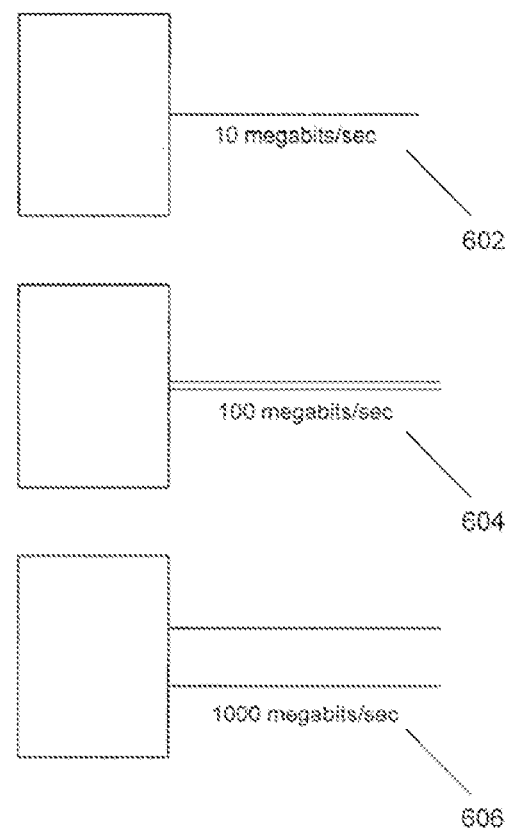
FIG. 6 illustrates common bandwidths for Ethernet links.

Ethernet physical links can include twisted-pair copper wires, optical fiber, coaxial cable, and signal lines within the backplane of a blade system. Data can be transmitted through Ethernet physical links and ports at different rates, depending on the ports, physical links, NICs, and control parameters communicated to NICs and other components. FIG. 6 illustrates common transmission rates for Ethernet devices. As shown in FIG. 6, common bandwidths for Ethernet links include 10 megabits per second 602, 100 megabits per second 604, and 1000 megabits, or one gigabit, per second 606. A 10-gigabit-per-second Ethernet link is also currently available, and 100-gigabit-per-second links are anticipated to be available in several years. Many NICs can be configured to transmit data at any one of the maximum transfer rates shown in FIG. 6.

Figure 7A:
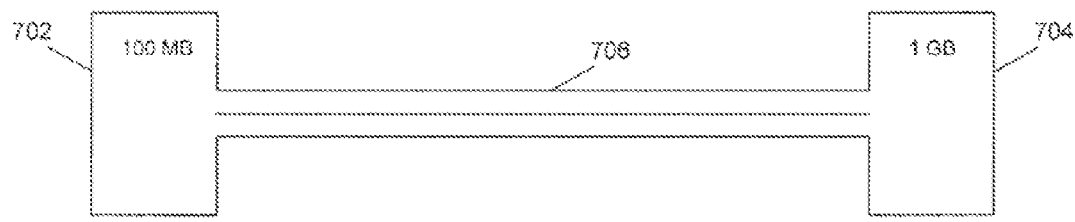
FIGS. 7A-C illustrate autonegotiation for transmission rate.
Figure 7B:
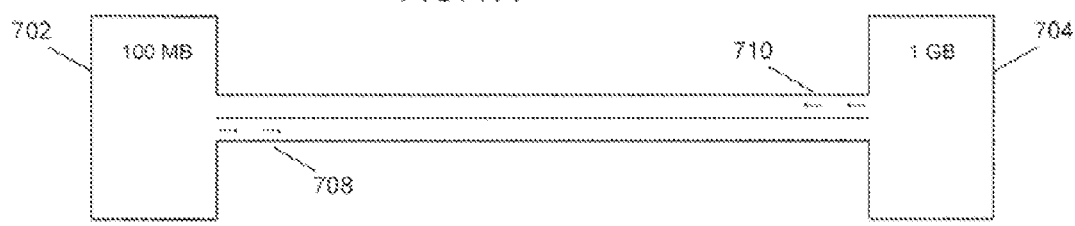
Figure 7C:
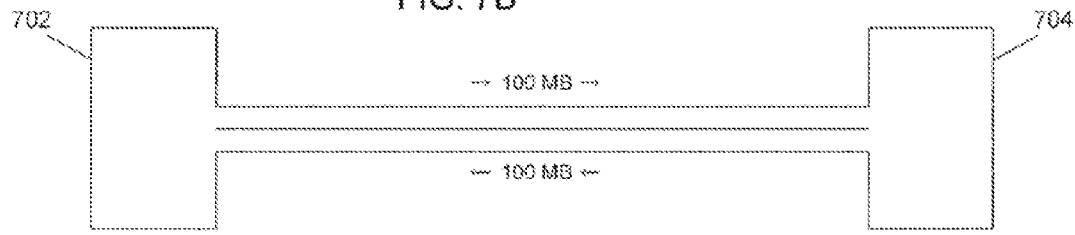

NICs within communicating devices can autonegotiate certain operational modes. FIGS. 7A-C illustrate autonegotiation for transmission rate. In FIG. 7A, a device 702 containing a NIC with a maximum configurable data-transmission rate of 100 megabits per second is interconnected with a device 704 containing a NIC with a maximum configurable data-transmission rate of one gigabit per second. The physical link 706 is capable of carrying data at one gigabit per second in each direction. As shown in FIG. 7B, in a configuration process following power up, the devices 702 and 704 exchange link code words 708 and 710 as part of an autonegotiation process, by which each device determines the remote device's capabilities and both devices then agree to communicate at the maximum transmission rate that can be handled by the slowest of the two devices. As shown in FIG. 7C, as the result of autonegotiation, the devices 702 and 704 are configured to transmit at 100 megabits per second, the maximum transfer rate of the slower of the two devices. Autonegotiation may also be used to determine whether or not to operate in half-duplex or full-duplex mode, with full-duplex mode preferred when both devices are capable of operating in full-duplex mode.

Because of the nature of the backplane interconnections within certain blade systems, autonegotiation and transmission-rate selection are not available to NICs within servers of the blade systems. Instead, in these blade systems, all NICs are required to operate at a particular, fixed maximum transmission rate. In the case of one class of blade systems, to which embodiments of the present invention are directed, the fixed, maximum transmission rate for all NICs within servers of the blade system is one gigabit per second. While, on first reflection, one gigabit per second seems to be a reasonable fixed rate for data transmission, since it is the highest data-transmission rate supported by many commonly available NICs incorporated within servers, the fixed maximum data-transmission may present problems within systems that include blade servers.

One problem is that, when a blade system is installed into a computing facility to replace an older-technology server or server cluster, various computers and components in the computing facility that previously communicated with the older-technology server or server cluster may be overwhelmed by the increased, aggregate data-transmission rate of multiple servers in the blade system. This problem could easily be solved with a stand-alone replacement server. The NICs within the server could be configured to operate at lower maximum transmission rates, such as 100 megabits per second or 10 megabits per second, since the maximum transmission rate is generally configurable for modern NICs. Many currently available NICs, for example, offer selection of one of the three data-transmission rates illustrated in FIG. 6. However, in the above-mentioned class of blade systems, because of the limitations of the backplane connections, configuring NICs within servers to operate at lower maximum data-transmission rates is not possible. Another approach to solving the problem would be to throttle higher-level entities running on the servers, such as application programs that request data-transmission services. However, changes to higher levels are difficult, inexact, error prone, and, in many cases, not possible, because the application programs are not designed for monitoring and throttling data-transmission rates generated by data-transmission requests to the operating system and because the application programs are often produced by external vendors reluctant to modify the application programs for special circumstances.

Embodiments of the present invention are directed to a different approach to solving problems associated with fixed-maximum-data-transmission rates for NICs within blade-system servers. In this approach, the virtual-connect-manager interface, discussed above with reference to FIGS. 3A-B, is implemented to provide for configuration, by blade-system administrators, of the maximum data-transmission rates of NICs within server modules of a blade system, through a configuration interface provided to blade-system administrators by the virtual-connect manager, and to monitor data-transmission rates and exert back pressure, or flow control, as needed to ensure that each NIC does not transmit data at rates higher than the configured maximum data-transmission rate.

Figure 8A:
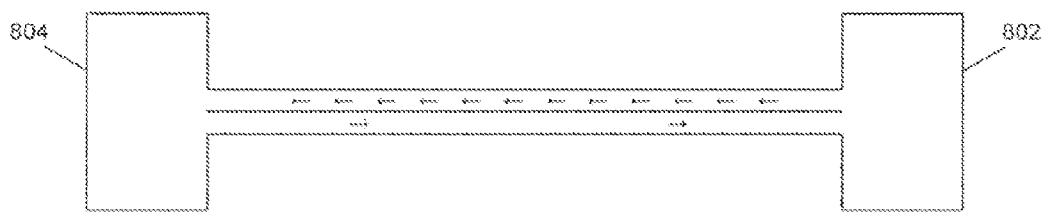
FIGS. 8A-E illustrate a flow-control mechanism provided for Ethernet-II-compliant devices.
Figure 8B:
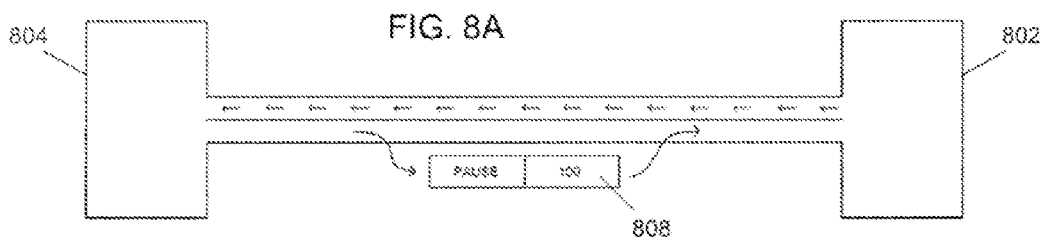
Figure 8C:
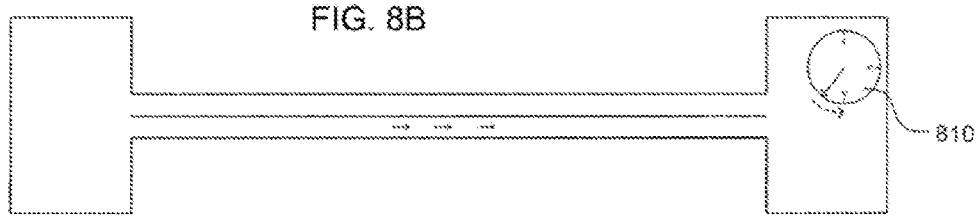
Figure 8D:
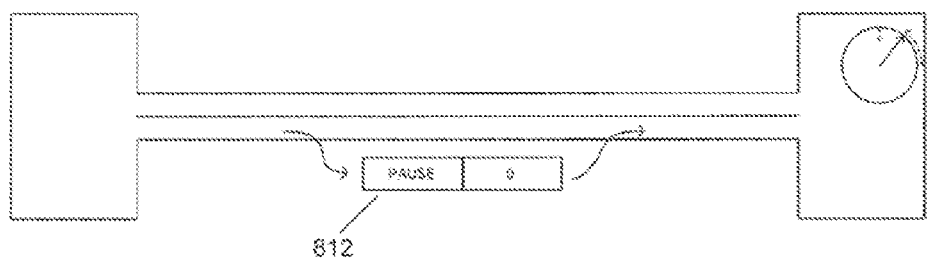
Figure 8E:
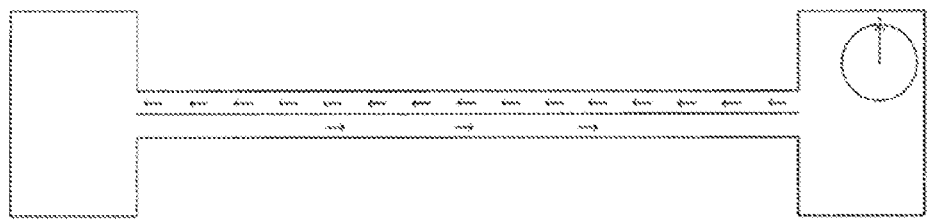

FIGS. 8A-E illustrate a flow-control mechanism provided for Ethernet-II-compliant devices. In the situation shown in FIG. 8A, where a first device 802 is transferring data to a second device 804 at a data-transmission rate that exceeds the second device's ability to process the received data, the second device, shown in FIG. 8B, can send a pause message to the first device 802 to cause the first device to cease data transmission for a specified period of time. The pause message is sent to a multicast address that can be received by all NICs connected to the physical medium. The pause message is encoded in the 2-byte Ethernet type/length field (512 in FIG. 5), and includes a 16-bit value 808 that specifies the time during which the receiving device should cease data transmission. This value expresses the time to cease data transmission in units of 512-bit transfer times. As shown in FIG. 8C, upon receiving the pause message, the receiving device sets a timer 810 and ceases transmission until the timer expires. As shown in FIG. 8D, the device that sent the pause message can explicitly override the pause message by sending a pause message 812 containing a specified cessation period of "0," referred to, below, as a "resume message," which resets the timer. As shown in FIG. 8E, the device that received the pause message resumes data transmission either when the timer expires or upon reception of a resume message.

Reception of a pause message by a NIC and cessation of data transmission by the NIC may result in higher levels of flow control within the server that contains the NIC. If data transmission is paused for a sufficient amount of time, NIC buffers and/or operating system buffers may be filled, resulting in failure of higher-level data-transmission operations. Such failed data-transmission operations may be automatically retried, by the operating system, or failures may flow back to higher-level entities, including application programs, which then retry failed data-transmission operations.

FIGS. 9A-K illustrate one approach to restricting maximum data-transmission rate by NICs within a blade system, according to one embodiment of the present invention. In this embodiment, the above-discussed pause message provided by Ethernet-II is employed, by a virtual-connect manager within a blade system, to exert back pressure on NICs when the NICs exceed maximum data-transmission rates established during configuration of the blade system.

FIGS. 9A-K, and FIGS. 10A-D, later discussed, all use the same illustration conventions. These figures illustrate specific variables, data structures, and other entities used within a virtual-connect manager to limit the maximum data-transmission rate of a particular server or a particular, individual port within a server, designated as a server/port pair. In certain embodiments, the virtual-connect manager can be employed to limit the maximum data-transmission rates for each server within a blade system, and, in other embodiments, each port within each server can be individually limited to a configured, maximum data-transmission rate.

For each server or server/port pair, depending on the embodiment, the virtual-connect manager maintains a timer 902, an array of n–1 accumulators, each accumulator of which accumulates the number of bits received during a fixed period of time by the virtual-connect manager from the server or server/port 904, a pointer to the currently used accumulator 906, a Boolean value "back pressure" 908 that indicates whether or not the virtual-connect manager is currently exerting back pressure with respect to the server or server/port pair, a configuration table 910 for the server or server/port pair, and an Ethernet-packet input 912 from the server or server/port pair. In addition, but not shown in FIG. 9A, the virtual-connect manager stores the address of the first accumulator and the number of accumulators n in the accumulator array 904, or the addresses of the first and last accumulators in the accumulator array. All of these data structures, variables, and entities are grouped together and computationally associated with a particular server or server/port, so that, for example, when an Ethernet packet is received, the source address contained in the Ethernet packet can be used, in an indexing or referencing operation, to locate the group of data structures, variables, and entities that describe a current virtual-connect-manager context for the server or server/port pair from which the Ethernet packet was sent. For example, a data structure may be employed to contain an accumulator array, current-accumulator pointer, Boolean value "back pressure," a reference to the timer, and a reference to the configuration table, and the MAC address of a server or server/port pair, so that the data structure can be immediately identified from the source address within a received Ethernet packet.

Figure 9A:
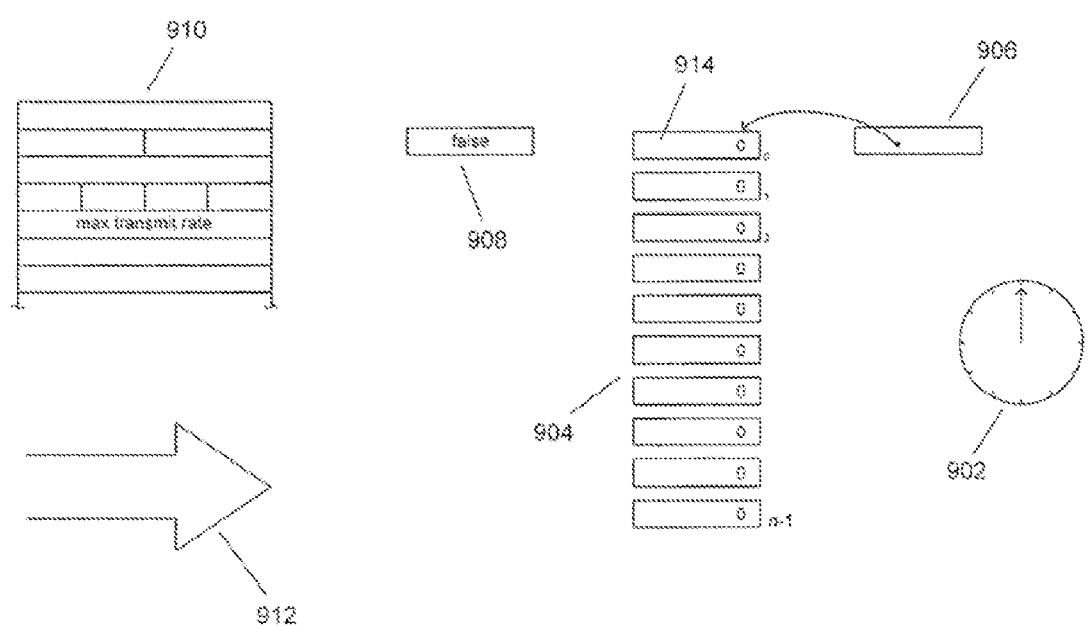
FIGS. 9A-K illustrate one approach to restricting maximum data-transmission rate by NICs within a blade system, according to one embodiment of the present invention.
Figure 9B:
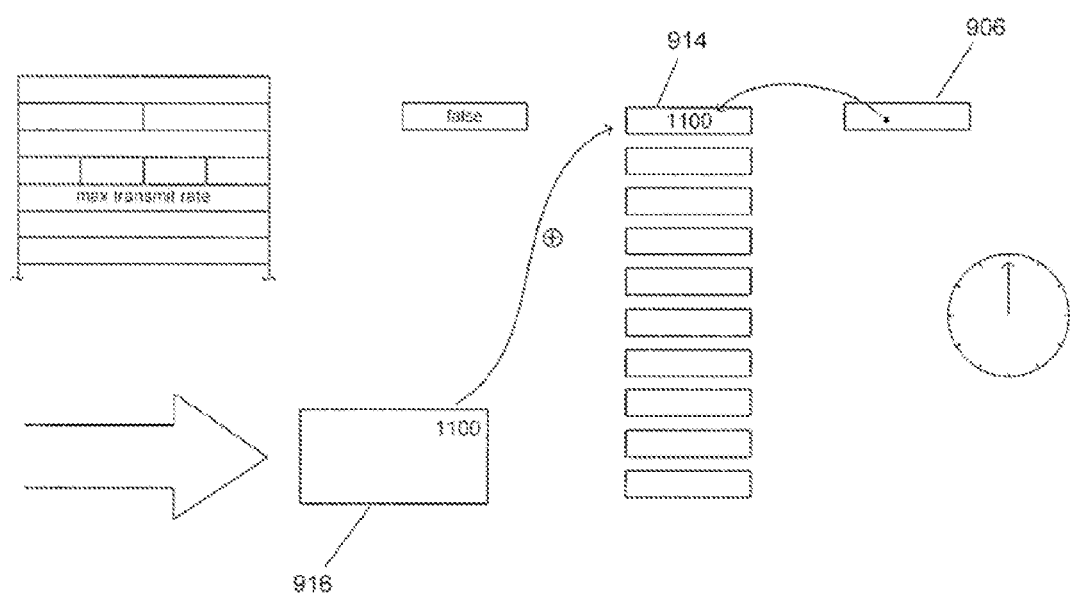
Figure 9C:
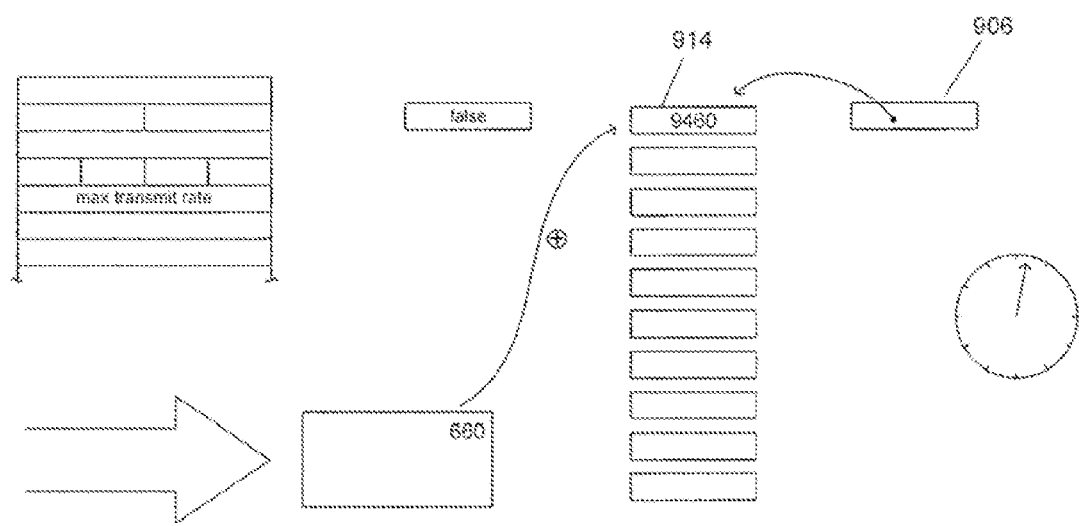

As shown in FIG. 9A, the virtual-context-manager context is initialized so that the accumulator pointer 906 references the first accumulator 914 in the array of accumulators 904 and the timer is set to expire in $$\frac{1}{n}$$

seconds, where n is the number of accumulators in the accumulator array. All of the accumulators are initialized to have the value "0." Once all the servers are powered up and initialized, and the virtual-connect manager powered up an initialized, packets begin to be received by the virtual-connect manager from server modules within the blade system. As shown in FIG. 9B, when a next packet arrives 916, the size of the packet, in bits, is added to the contents of the accumulator 914 currently referenced by the current-accumulator pointer 906. FIG. 9C shows the arrival of a second packet, and addition of the number of bits contained in the second packet to the accumulator 914 referenced by the current accumulator-pointer 906.

Figure 9D:
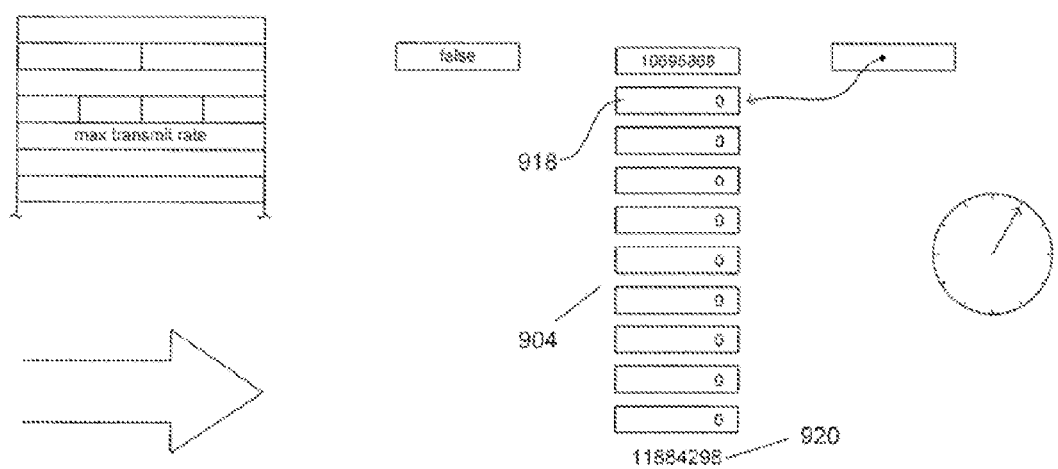
Figure 9E:
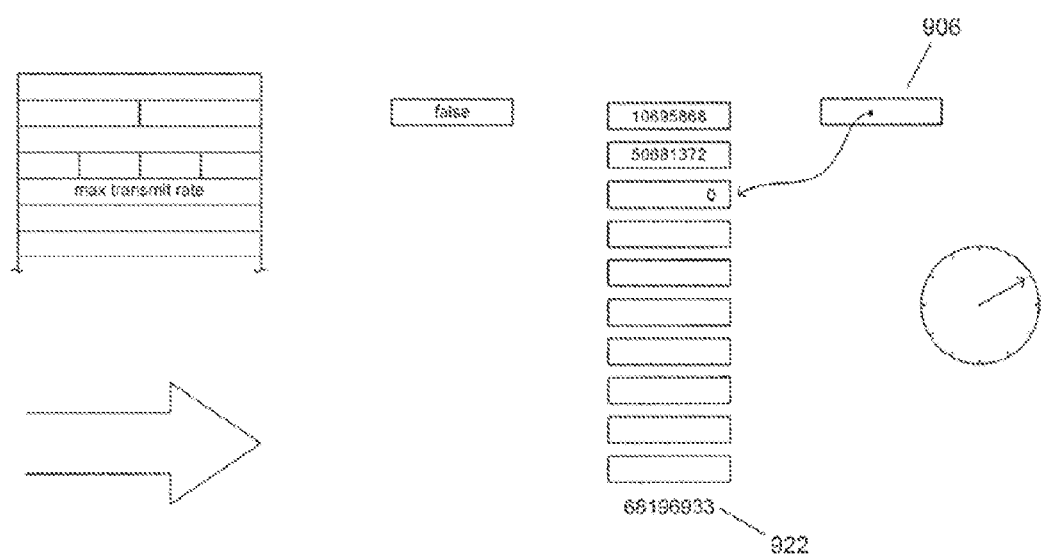
Figure 9F:
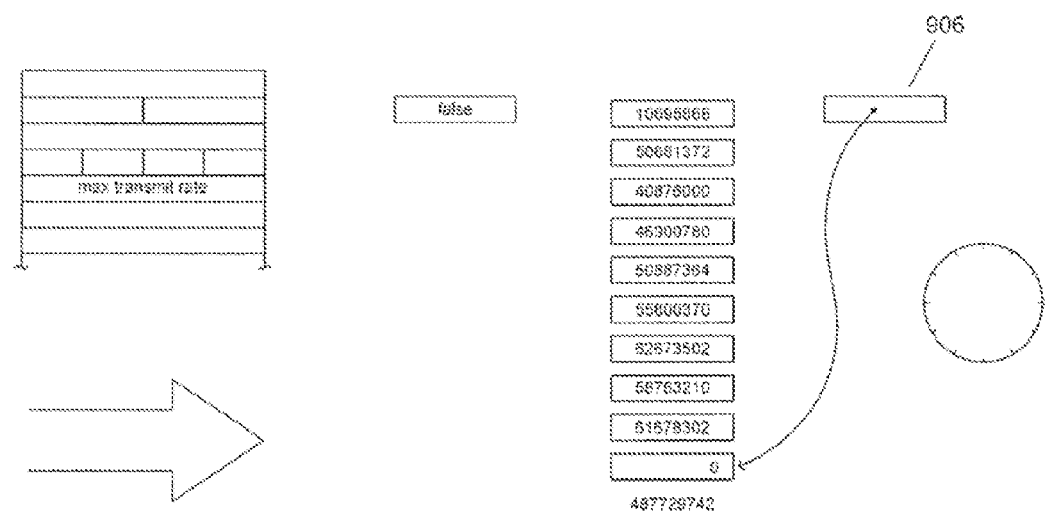

As shown in FIG. 9D, when the timer expires, at $$\frac{1}{n}$$

seconds, the current-accumulator pointer is incremented, by modulo n arithmetic, to point to a next accumulator 918, which is cleared. All of the accumulators in the accumulator array 904 are added together to produce the total number of bits 920 received from the server or server/port during the last second. To be more precise, the sum of the accumulators may be multiplied by the ratio $$\frac{n}{n-1}$$

to produce an estimate of the number of bits transmitted by the server or server/port during the previous second. As shown in FIG. 9E, following the second timer expiration, the current-accumulator pointer 906 is again incremented by modulo n addition, and the sum of the accumulators is multiplied by the ratio $$\frac{n}{n-1}$$

to generate the number of bits received by the server or server/port during the previous second 922. This process continues, with the timer expiring at every subsequent interval of $$\frac{1}{n}$$

seconds. In FIG. 9F, the accumulator array is fully filled with values.

Figure 9G:
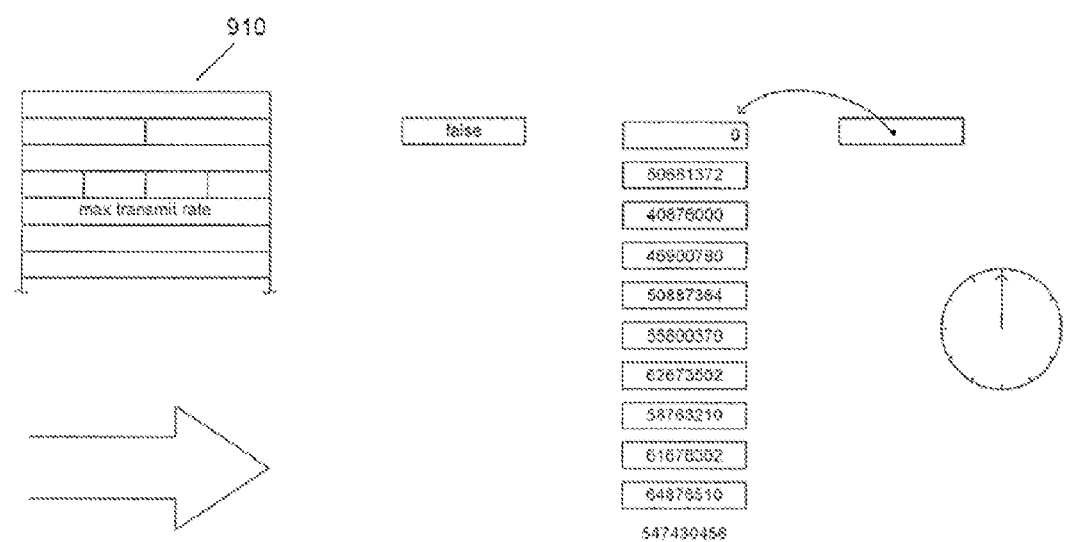
Figure 9H:
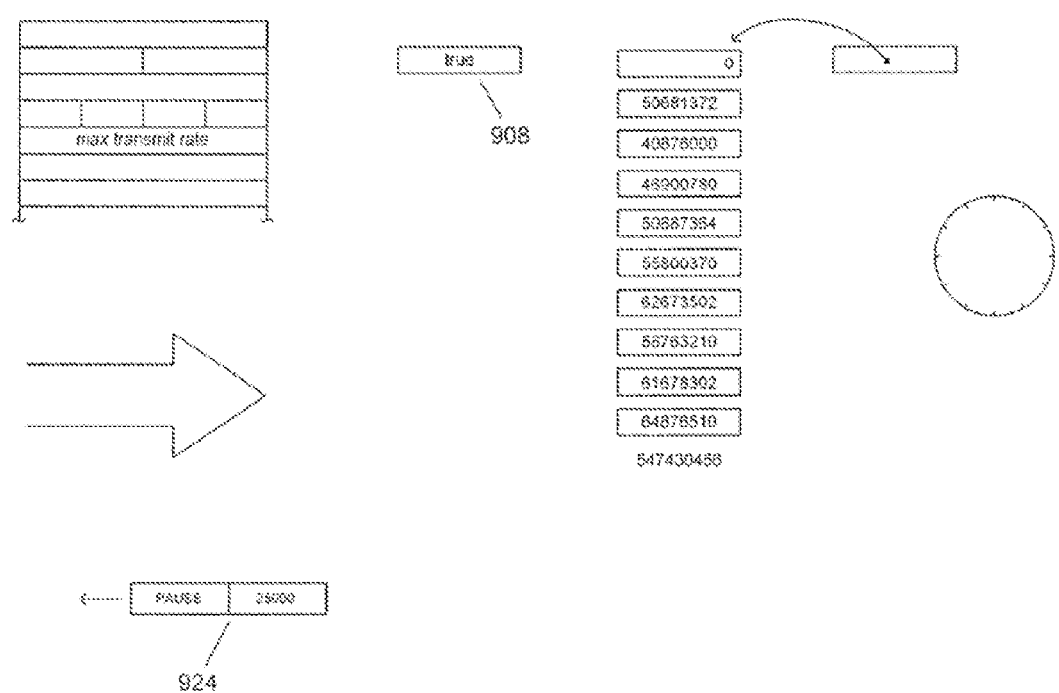
Figure 9I:
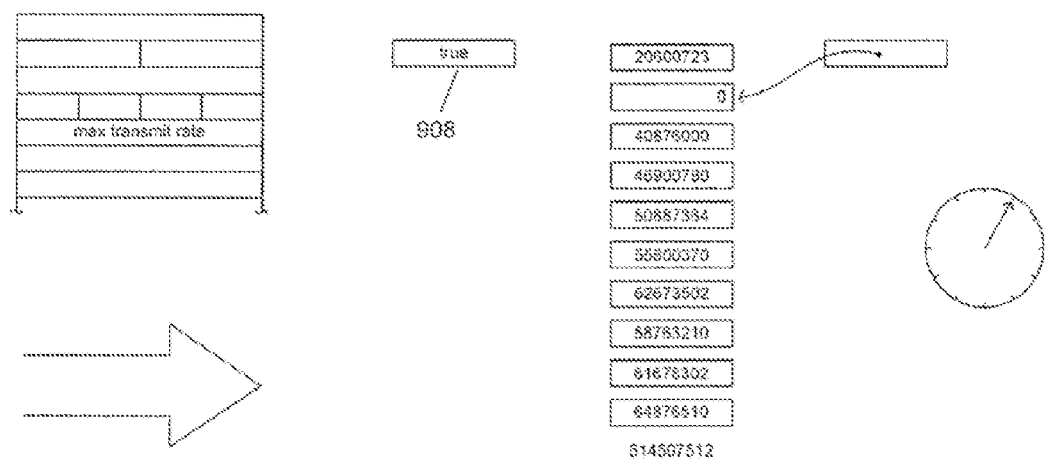
Figure 9J:
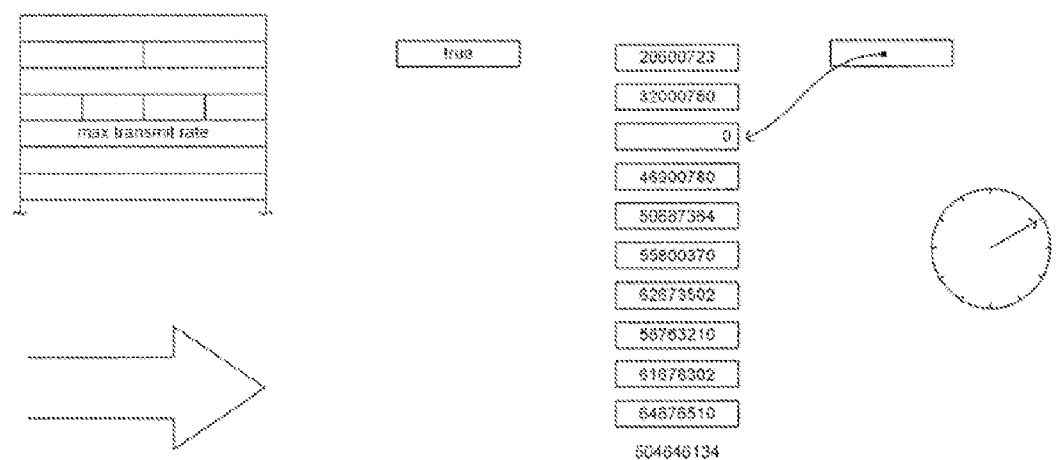
Figure 9K:
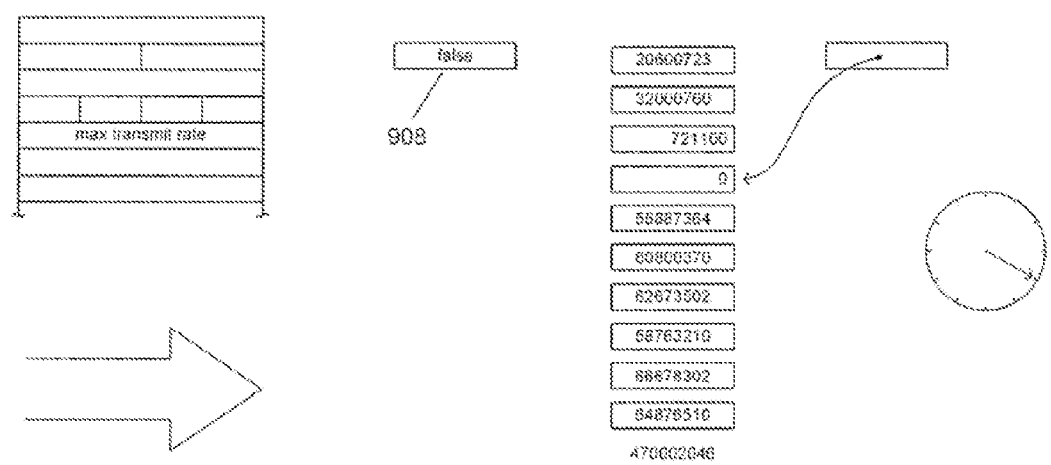

At each $$\frac{1}{n} - \text{second interval,}$$

the total number of bits contained in the n accumulators, multiplied by the ratio $$\frac{n}{n-1},$$

is compared with a maximum data-transmission rate configured for the server or server/port stored in the configuration table 910. As shown in FIG. 9G, when the data-transmission rate estimated for the past second exceeds the maximum data-transmission rate configured for the server or server/port, then, as shown in FIG. 9H, the Boolean variable "back-pressure" 908 is set to TRUE, and a pause message 924 is sent to the ports of the server or server/port to stop transmission by the server or server/port for a fixed amount of time. The fixed amount of time, or pause time, is computed to be the amount of time that, were the server or server/port to be halted for that amount of time n times a second, the data-transmission rate of the server or server/port, at its current data-transmission rate, would be decreased below the maximum data-transmission rate for which the server or server/port is configured. In general, the estimated pause time is increased by some additional factor, referred to below as the value "slop," to ensure that the data-transmission rate of the server or server/port falls significantly below the maximum data-transmission rate for some initial period of time. Then, as shown in FIGS. 9I-J, the normal operations continue. At each timer expiration, or $$\frac{1}{n} - \text{second interval,}$$

while the Boolean variable "backpressure" 908 remains TRUE, pause messages are sent to the ports of the server or server/port. Subsequently, as shown in FIG. 9K, should the data-transmission rate computed for the server or server/port over the past second fall below a low threshold value significantly less than the maximum data-transmission rate for which the server or server/port is configured, the Boolean value "backpressure" 908 is then set to FALSE, and no further pause messages are sent until the data-transmission rate again exceeds the maximum data-transmission rate configured for the server or server/port. Thus, according to the above-described first embodiment of the present invention, once the data-transmission rate of a server or server/port exceeds the maximum configured data-transmission rate for the server or server/port, pause messages are sent at fixed, timer-expiration-detected intervals to pause the server or server/port for small periods of time within each time interval in order to lower the overall data-transmission rate of the server or server/port significantly below the maximum data-transmission rate configured for that server or server/port.

Figure 10A:
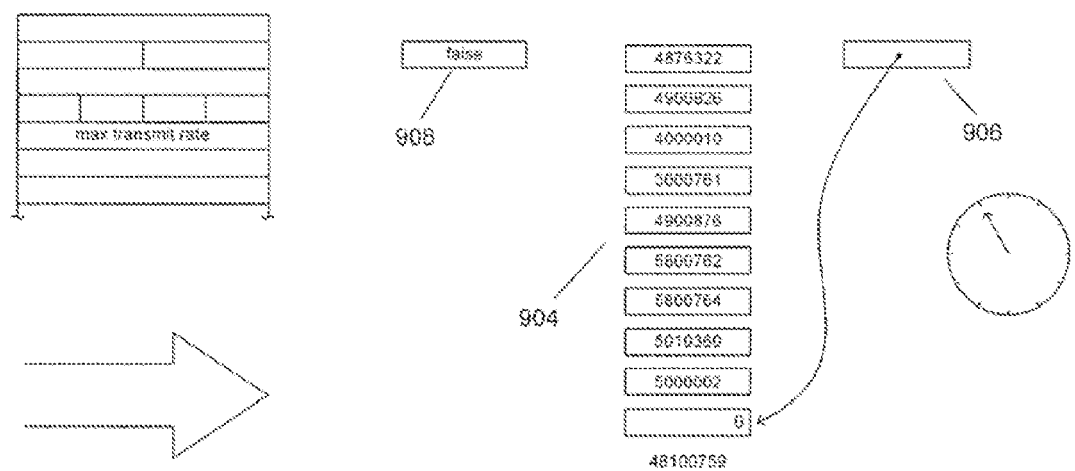
FIGS. 10A-D illustrate a second embodiment of the present invention.
Figure 10B:
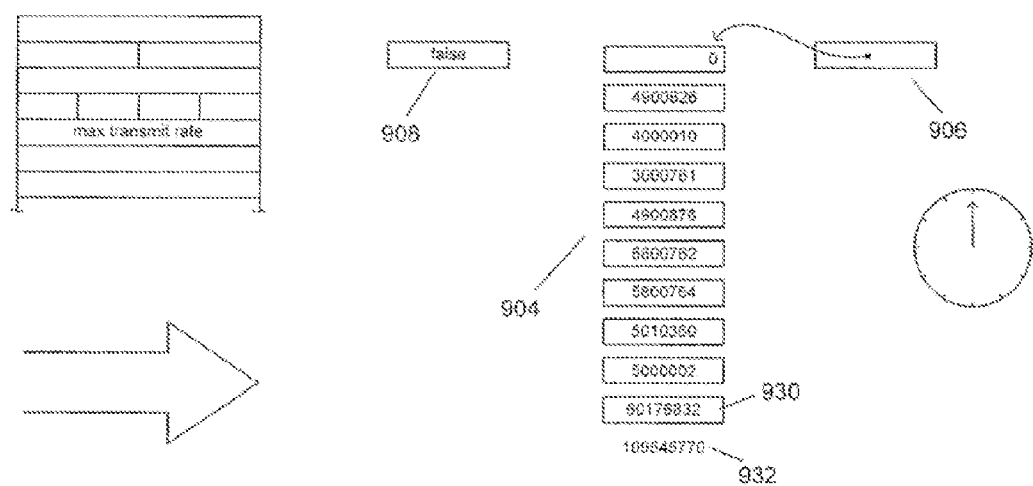
Figure 10C:
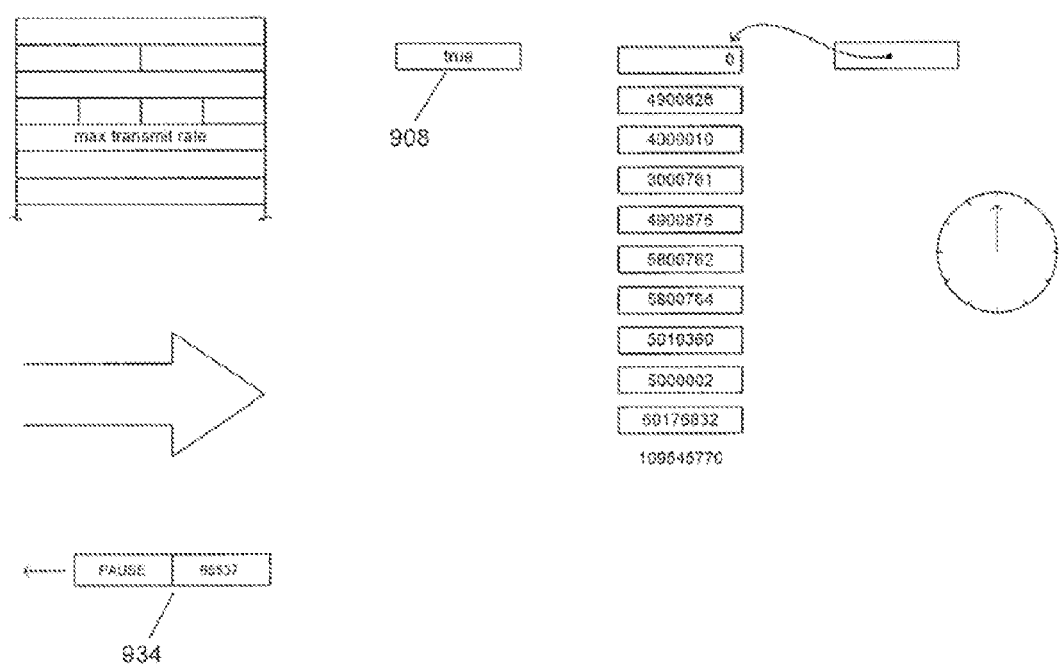
Figure 10D:
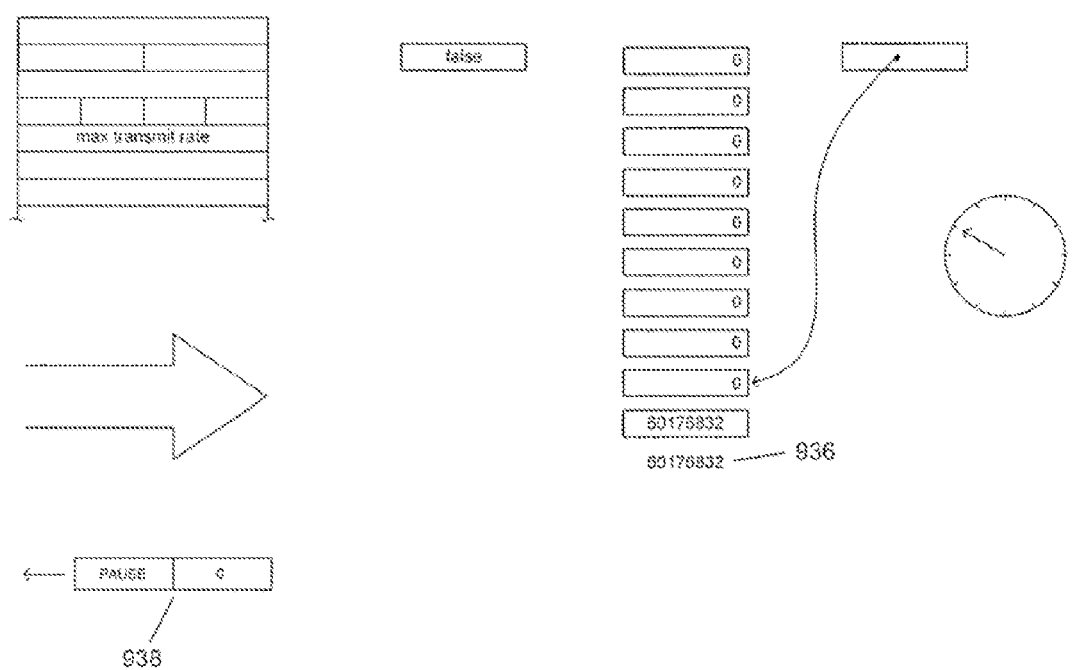

FIGS. 10A-D illustrate a second embodiment of the present invention. The same data structures employed in the first embodiment are employed in the second embodiment, as can be seen by comparing FIG. 10A to FIG. 9A. FIG. 10A shows the contents of the accumulator registers and the current state of the Boolean variable "backpressure" 908 and current-accumulator pointer 906 following a timer expiration. FIG. 10B shows the contents of the accumulators 904, back pressure register 908, and current-accumulator register 906 following a next timer expiration. Note that, during the preceding $$\frac{1}{n}$$

seconds, an enormous increase in the data-transmission rate of the server or server/port has occurred, as evidenced by the value in accumulator 930. This has caused the data-transmission rate 932 computed for the past second to more than double, and to greatly exceed a configured maximum data-transmission rate for the server or server/port. At this point, as in the previous embodiment, the Boolean variable "backpressure" is set to TRUE 908 and a pause message 934 is sent to the server or server/port. However, in this case, the pause message includes a largest-possible pause time so that the receiving ports of the server or server/port will simply halt data transmission for a significant period of time. Then, the same timer reset and subsequent expiration pattern and current-accumulator-pointer modulo increment continues, as discussed above, until, as shown in FIG. 10D, the computed data-transmission rate for the past second falls below some low threshold value 936. At this point, a resume message 938 is sent to the server or server/port to restart data transmission.

There are many additional, alternative embodiments that may be implemented for using the pause message available in Ethernet II to exert back pressure on a server or a server/port in order to ensure that the configured data-transmission rate for the server or server/port does not exceed the maximum data-transmission rate configured for the server or server/port. Fewer accumulators may be employed, events other than timer events may be used to awaken the monitoring routines in order to monitor each server or server/port in a continuous fashion, and other alternative implementations are possible. However, in all cases, the virtual-connect manager uses the Ethernet-II pause message in order to control the overall data-transmission rate of each server or server/port.

Figure 11A:
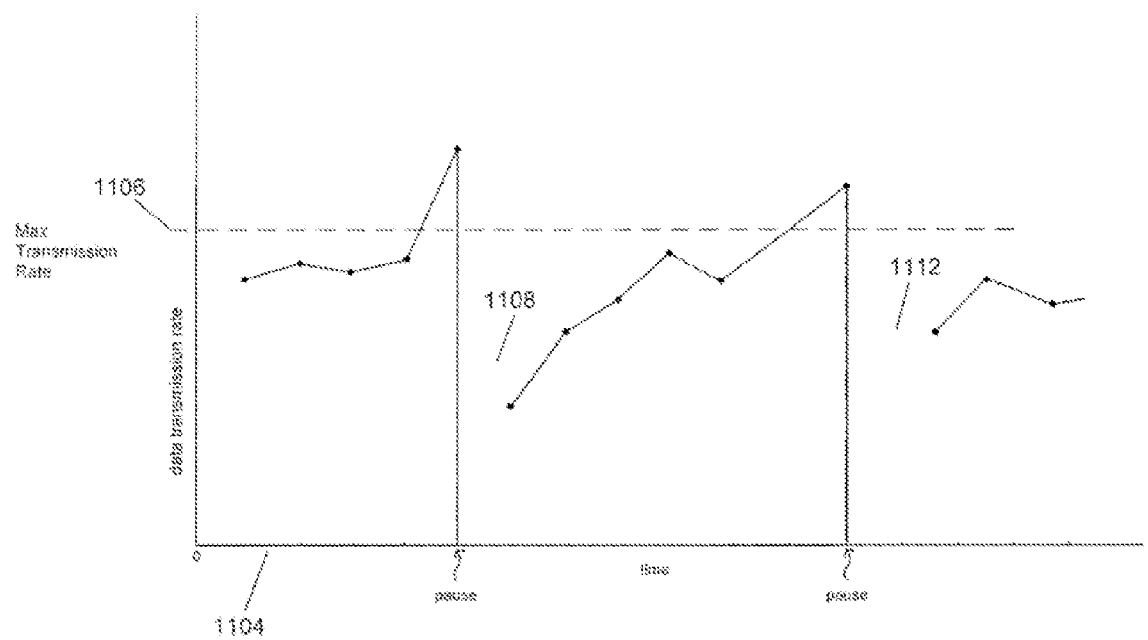
FIGS. 11A-B illustrate an overall effect produced by implementations of embodiments of the present invention.
Figure 11B:
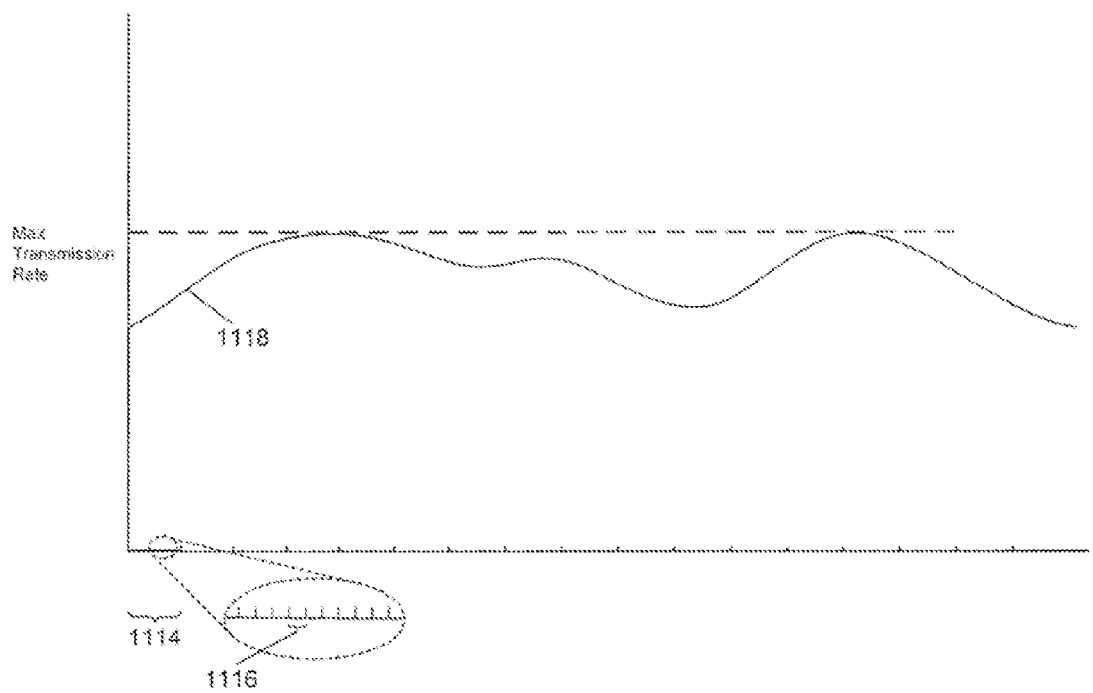

FIGS. 11A-B illustrate an overall effect produced by implementations of embodiments of the present invention. In FIG. 11A, the data transmission rate, plotted with respect to a vertical axis 1102, is graphed with respect to time, plotted with respect to a horizontal axis 1104. In FIG. 11A, the time increments are quite short, on the order of $$\frac{1}{n}$$

seconds or smaller. As shown in FIG. 11A, the data-transmission rate may vary, over time, until the data-transmission rate exceeds the maximum data-transmission rate 1106, at which point a pause message is sent and the data transmission rate falls to zero 1108 for a period of time. Then, following the pause 1110, the data-transmission rate jumps back to some finite value and continues to increase and decrease until, again, the data-transmission rate exceeds the maximum data-transmission rate configured for the server or server/port 1110, at which point another pause message is sent, and the data-transmission rate falls to zero for another period of time 1112. Thus, when viewed at small increments of time, the data-transmission rate for the server or server/port appears quite discontinuous, and features peaks above the maximum data-transmission rate and periods of no data transmission. However, as shown in FIG. 11B, when the data-transmission rate for the server or server/port is graphed over much larger periods of time, as, for example, with the increment 1114 in FIG. 11B representing hundreds of increments 1116 in FIG. 11A, then the data-transmission rate for the server or server/port 1118 appears to be continuous, and never exceeds the maximum data-transmission rate. In fact, in the curve computed over very small increments of time, as shown in FIG. 11A, the data-transmission rate is seen to occasionally exceed the maximum data-transmission rate for short periods of time. However, as shown in FIG. 11B, when the data-transmission rate is computed over longer periods of time, the short spikes are averaged out into longer periods of time, so that the data-transmission rate appears continuous and always below the maximum data-transmission-rate line.

Figure 12:
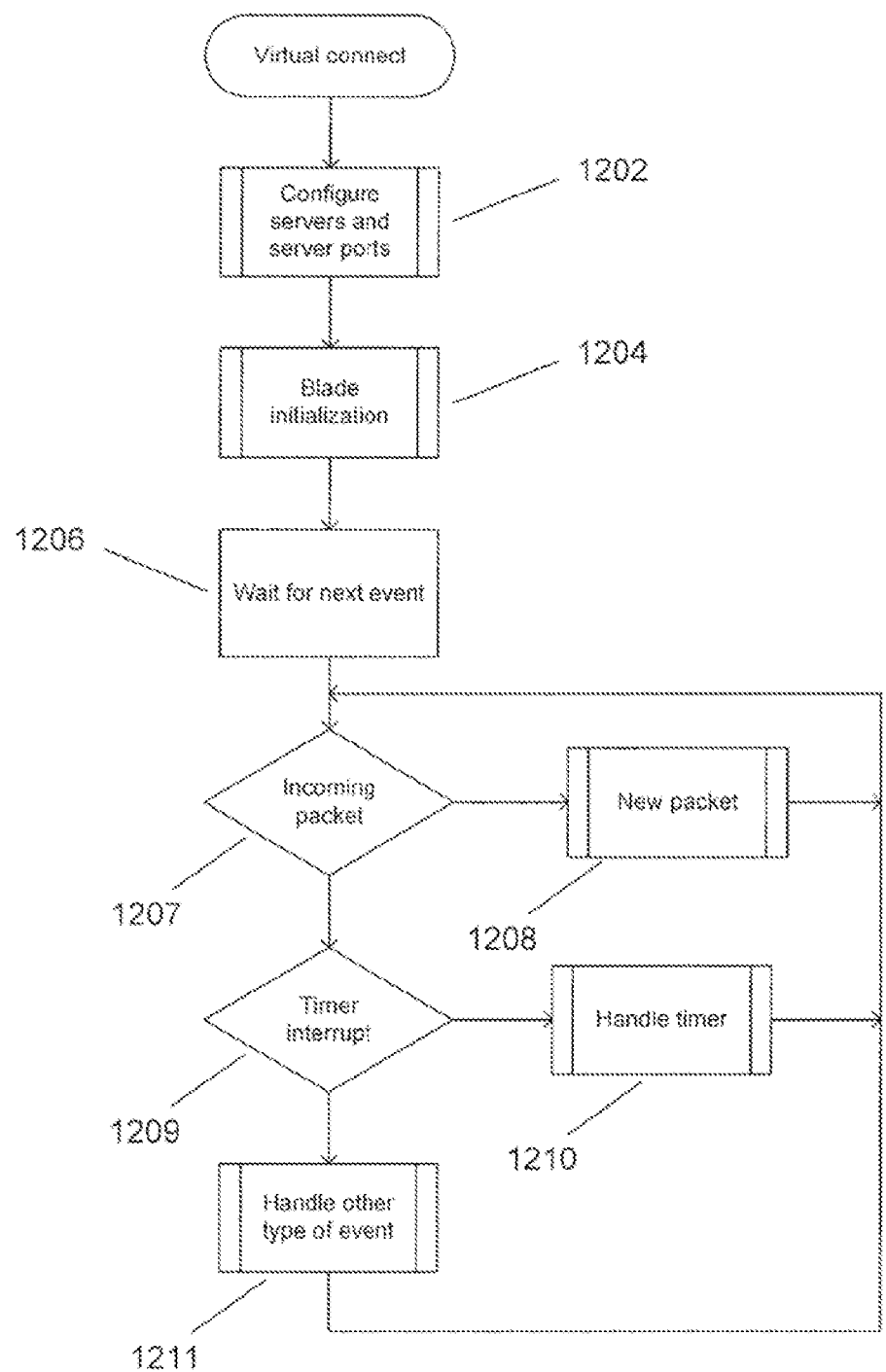
FIG. 12 provides a control-flow diagram for a virtual-connect manage that implements either of the two described embodiments of the present invention.

FIGS. 12-15 show control-flow diagrams that illustrate the two different embodiments of the present invention described above with reference to FIGS. 9A-K and 10A-D. FIG. 12 provides a control-flow diagram for a virtual-connect manager that implements either of the two described embodiments of the present invention. In step 1202, the virtual-connect manager, upon power up or reset, undertakes configuration of all of the servers and server ports within a blade system according to configuration information stored in configuration tables. In step 1204, the blade system is initialized for operation. Then, in an event loop comprising steps 1206-1211, the virtual-connect manager waits for, and handles, any of numerous different types of events. In the case that the event is an incoming packet from a server within the blade system, as determined in step 1207, the handler "new packet" is called in step 1208. In the case the event is a timer interrupt associated with a maximum-data-transmission-rate timer expiration, as determined in step 1209, then the handler "handle timer" is called in step 1210. Any of numerous other types of events are handled by a catch-all event handler in step 1211, including events generated by the administrator interface, events related to communications-media problems, events related to power or environmental conditions within the blade system, and other events. This event loop continues for as long as the virtual-connect manager operates.

Figure 13:
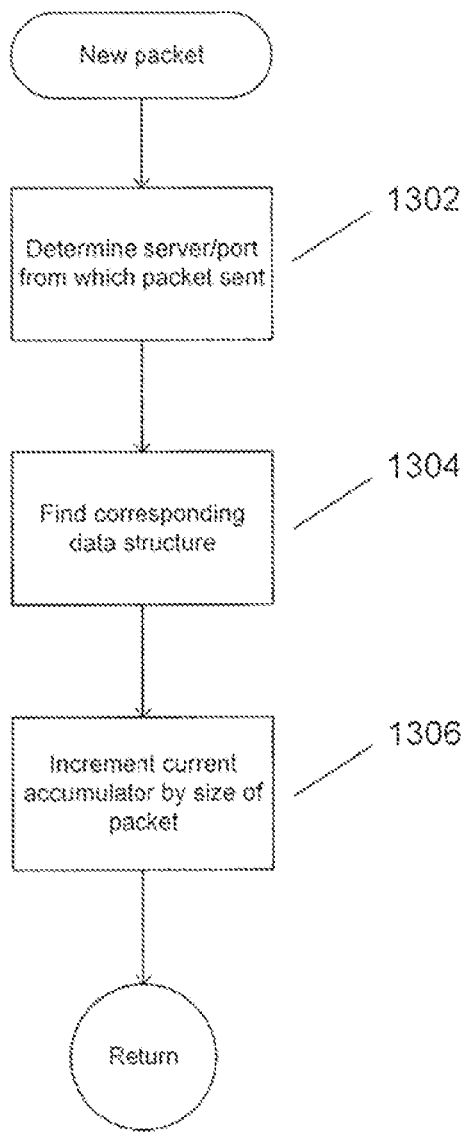
FIG. 13 provides a control-flow diagram for the handler "new packet" called in step 1208 of FIG. 12, according to one embodiment of the present invention.

FIG. 13 provides a control-flow diagram for the handler "new packet" called in step 1208 of FIG. 12, according to one embodiment of the present invention. In step 1302, the virtual-connect manager determines the server or server/port from which the packet was received. In step 1304, the virtual-connect manager finds the data structure or data structures corresponding to the server or server/port, as discussed with reference to FIG. 9A, and increments the current accumulator referenced by the current-accumulator pointer (906 in FIG. 9A) by the size, in bits, of the received packet in step 1306. Thus, the overhead introduced by embodiments of the present invention for handling each incoming packet is minimal.

Figure 14:
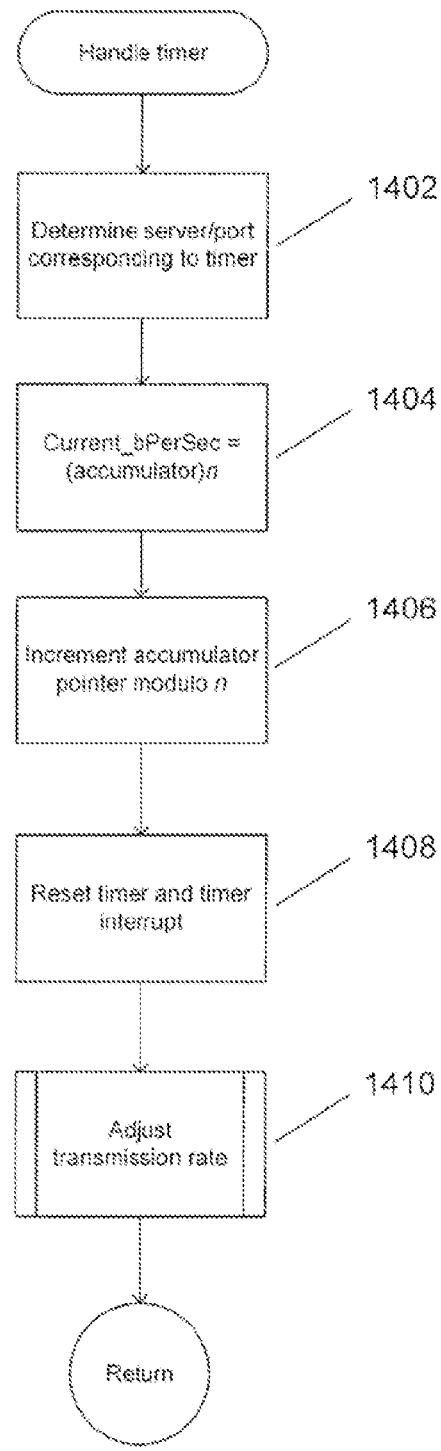
FIG. 14 provides a flow-control diagram for a first portion of the handler "handle timer," called in step 1210 of FIG. 12, according to one embodiment of the present invention.

FIG. 14 provides a flow-control diagram for a first portion of the handler "handle timer," called in step 1210 of FIG. 12, according to one embodiment of the present invention. In step 1402, the virtual-connect manager determines the server or server/port corresponding to the expired timer. In step 1404, the virtual-connect manager computes a current, instantaneous data-transmission rate for the server or server/port as the contents of the current accumulator multiplied by the number of accumulators n. In step 1406, the virtual-connect manager increments the current-accumulator pointer by modulo n arithmetic and, in step 1408, resets the timer and timer-expiration interrupts to provide for detection of the end of the next monitoring interval. Then, in step 1410, a routine "adjust transmission rate" is called.

Figure 15:
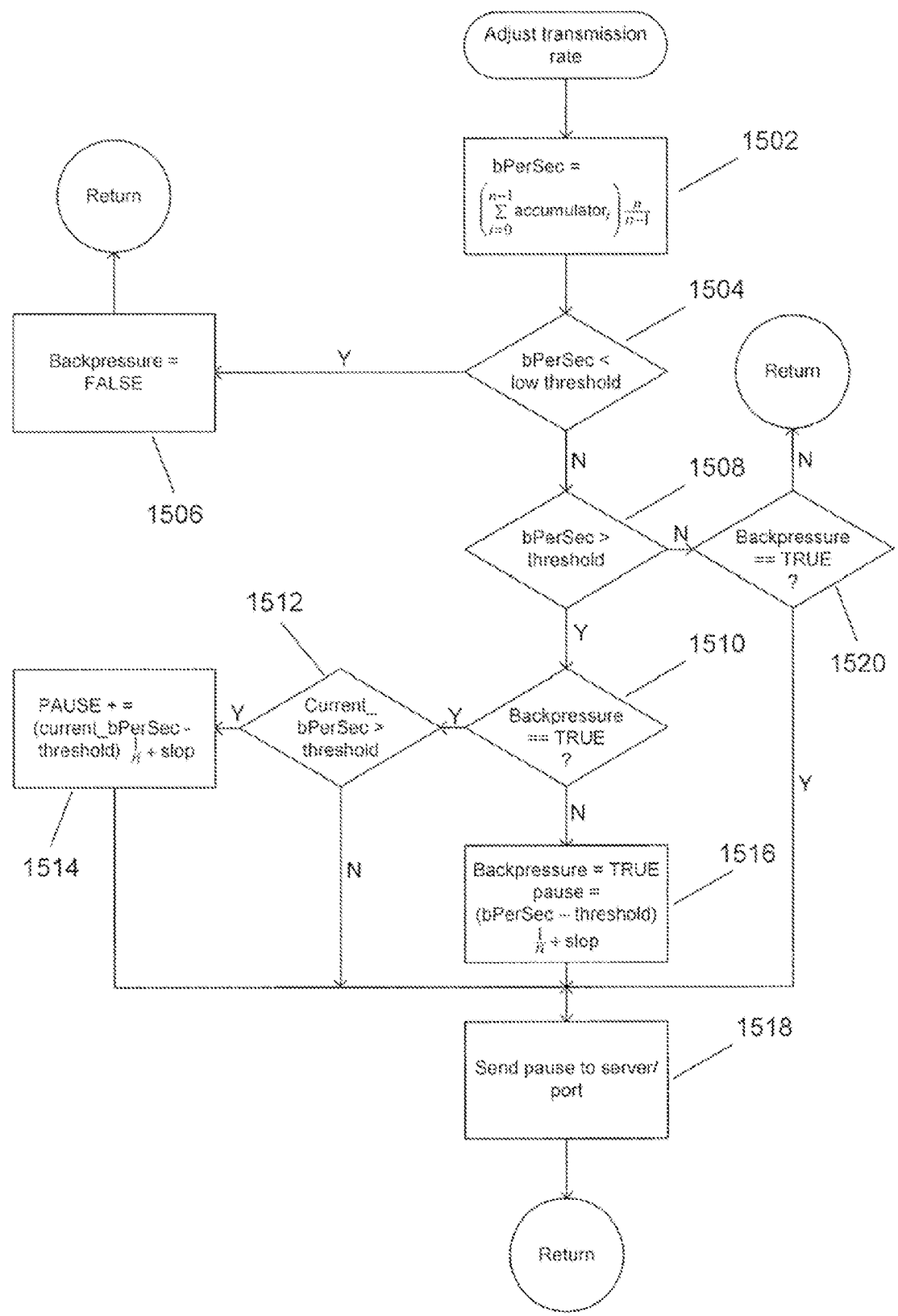
FIG. 15 provides a control-flow diagram of the routine "adjust transmission rate," called in step 1410 of FIG. 14, according to the first embodiment of the present invention described with reference to FIGS. 9A-K.

FIG. 15 provides a control-flow diagram of the routine "adjust transmission rate," called in step 1410 of FIG. 14, according to the first embodiment of the present invention described with reference to FIGS. 9A-K. In step 1502, a current transmission rate is computed as the sum of all of the accumulators (904 in FIG. 9A) multiplied by the ratio $$\frac{n}{n-1}.$$

When the current transmission rate is less than a low threshold value, as determined in step 1504, then the Boolean variable "backpressure" is set to FALSE, in step 1506, and the routine terminates. Otherwise, when the current data transmission rate is greater than the maximum data-transmission rate configured for the server or server/port, as determined in step 1508, then, when the Boolean variable "backpressure" currently has the value TRUE, as determined in step 1510, and when the current, instantaneous data-transmission rate (See step 1404 in FIG. 14) is greater than the maximum data-transmission rate, as determined in step 1512, the pause time for pausing the server or server/port is incremented, in step 1514, to reflect the fact that the data-transmission rate remains above the maximum data-transmission rate configured for the device. When the instantaneous data-transmission rate is not greater than the maximum data-transmission rate, as determined in step 1512, no pause-period recalculation is needed. When the Boolean variable "backpressure" is not TRUE, as determined in step 1510, then the Boolean variable "backpressure" is set to TRUE and a pause time is computed, in step 1516. A pause time stored in a variable "pause" is computed as the amount of time that the server or server/port should be halted, during each $$\frac{1}{n} - \text{second interval}$$

periods of time, in order to decrease the data-transmission rate of the server or server/port below the maximum data-transmission rate configured for the server or server/port. An additional value, "slop," is added to the estimated value in order to ensure that the data-transmission rate for the server or server/port is pushed below the maximum data-transmission rate. Then, in step 1518, a pause message is sent to the ports of the server or the server/port using the current value of the variable "pause." When the current data-transmission rate is not above the maximum data-transmission rate configured for the device, as determined in step 1508, then the routine finishes, unless the current value of the Boolean variable "backpressure" is TRUE, as determined in step 1520, in which case a next pause message is sent in step 1518.

Figure 16:
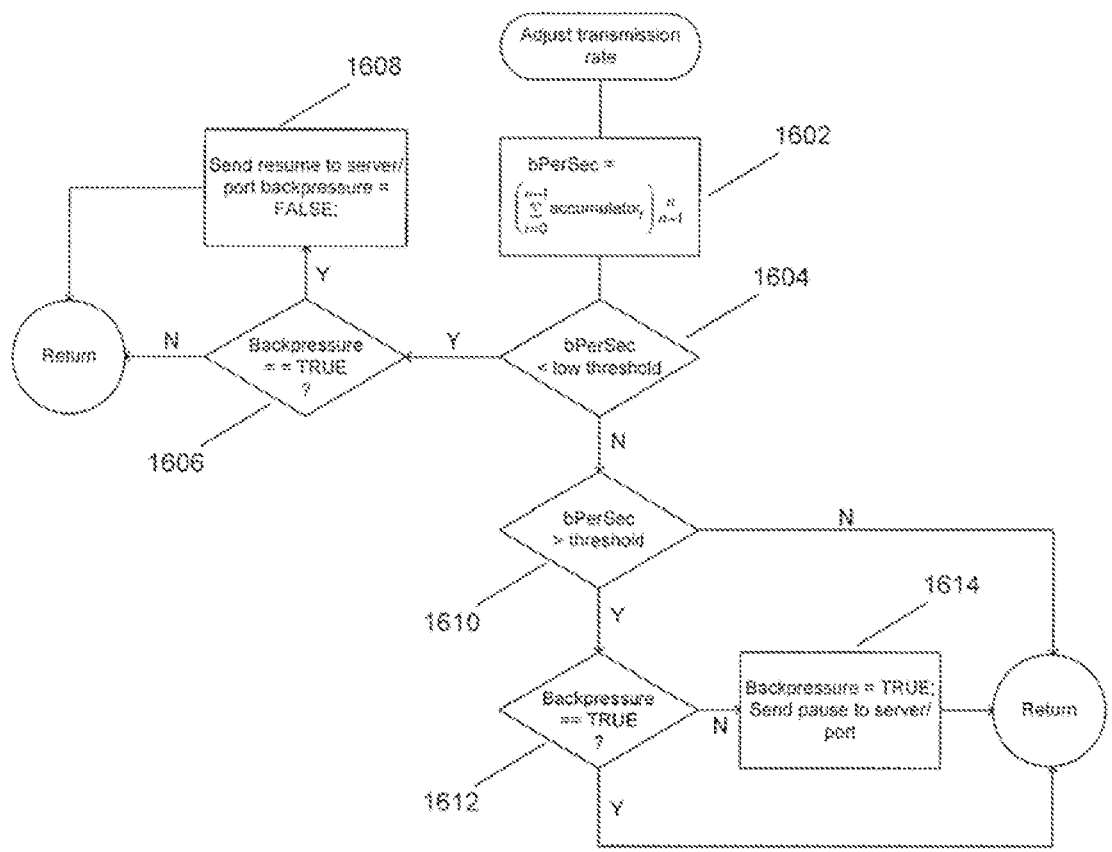
FIG. 16 is a control-flow diagram for a second implementation of the routine "adjust transmission rate" called in step 1410 of FIG. 14, according to the second embodiment of the present invention described with reference to FIGS. 10A-D.

FIG. 16 is a control-flow diagram for a second implementation of the routine "adjust transmission rate" called in step 1410 of FIG. 14, according to the second embodiment of the present invention described with reference to FIGS. 10A-D. As in FIG. 15, the current data-transmission rate is computed, in step 1602. When the current data-transmission rate is greater than a low threshold value, as determined in step 1604, and when the Boolean variable "backpressure" has the value TRUE, as determined in step 1606, then a resume message is sent to the server or server/port in step 1608, and the Boolean variable "backpressure" is set to FALSE. Otherwise, when the current data-transmission rate exceeds the maximum data-transmission rate configured for the server or server/port, as determined in step 1610, then when the Boolean variable "backpressure" currently has the value FALSE, as determined in step 1612, a pause message is sent to the server or server/port in step 1614.

Although the present invention has been described in terms of particular embodiments, it is not intended that the invention be limited to these embodiments. Modifications within the spirit of the invention will be apparent to those skilled in the art. For example, embodiments of the present invention may be implemented in hardware circuits, firmware, and/or software that resides in, or executes within, a virtual-connect manager of a blade system, or in another component of a blade system that can monitor data transmission from ports within servers of the blade system. The present invention may be implemented in many different ways, by varying common hardware-design, firmware-design, and/or software-design parameters, such as modular organization, control structures, data structures, variables, logic structures, and routine flow. As discussed above, servers may be configured for maximum transmission rates over a particular type of communications medium, over all communications media, or through specific ports, depending on the implementation. In alternative implementations, a maximum data-transmission rate can be configured for groups of servers or for an entire blade system. In certain embodiments, any combination of individual servers, ports within servers, and groups of servers may be configured for maximum data-transmission rates and flow controlled to ensure that the configured maximum data-transmission rates are not exceeded. In all cases, data transmission rates of controlled servers, ports, or groups of servers are monitored and flow-control messages or signals are used to ensure that each configured data-transmission rate is no exceeded. Although the present invention is discussed, above, in the context of a multi-server enclosure, the present invention may be applied to other types of multi-device enclosures, in which the devices include ports to communications media. In the above-discussed implementation, monitoring routines are invoked for each interval for each server or server/port, but, in alternative implementations, the monitoring routines may monitor and flow control multiple servers and/or server/ports during a single invocation.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A multi-device enclosure unit comprising:
    a common backplane;
    a plurality of devices that include ports to connect the devices to the common backplane; and
    a data-transmission-rate monitor connected to the common backplane, the data-transmission-rate monitor comprising:
        an electronic memory storing at least a specification of a predefined data-transmission rate configured for each device or port within the multi-device enclosure unit;
        a monitoring component to determine a current data-transmission rate for each device or port within the multi-device enclosure unit, and, in response to the current data-transmission rate for a particular device or port within the multi-device enclosure unit exceeding the predefined data-transmission rate configured for the particular device or port, transmit a pause command to the particular device or port;
        an interval-timing component to invoke the monitoring component at intervals of 1/n seconds during operation of the multi-device enclosure, wherein n is an integer greater than 1; and
        an accumulator component to, when a data transfer is received from the particular device or port by the data-transmission-rate monitor, add an amount of data transferred by the particular device or port in the data transfer to an accumulator that accumulates a total amount data transferred by the particular device or port during a current interval of time.

2. The multi-device enclosure unit of claim 1, wherein the data-transmission-rate monitor is implemented within a virtual-connect manager of a blade system.

3. The multi-device enclosure unit of claim 1 wherein the common backplane comprises Ethernet links, and the pause command is an Ethernet pause message that includes a type/length field indicating that the message is a pause message and a pause time.

4. The multi-device enclosure unit of claim 1, wherein the accumulator component is to add the amount of data transferred in each received data transfer from the particular device or port to one accumulator referenced by a current-accumulator reference from among n accumulators, and wherein, at each interval, the monitoring component is to increment the current-accumulator reference by modulo n arithmetic and clear the accumulator referenced by the incremented current-accumulator reference.

5. The multi-device enclosure unit of claim 4, wherein the monitoring component is to determine the current data-transmission rate for the particular device or port by adding the values stored in the n accumulators.

6. The multi-device enclosure unit of claim 4 wherein the interval monitoring component is to determine the current data-transmission rate for the particular device or port by adding the values stored in the n accumulators to produce a sum and by multiplying the sum by $$\frac{n}{n-1}.$$

7. The multi-device enclosure unit of claim 1 wherein the monitoring component is to:
    when the current data-transmission rate for the particular device or port is below a first threshold, store, in a backpressure variable, an indication that pause commands should not be sent to the particular device or port.

8. The multi-device enclosure unit of claim 1 wherein the monitoring component is to:
    when the current data-transmission rate for the particular device or port is greater than the predefined data-transmission rate configured for the particular device or port and a value stored in a backpressure variable indicates that a pause command has not been sent to the particular device or port, send a pause command to the particular device or port and store an indication in the backpressure variable indicating that a pause command has been sent to the particular device or port.

9. The multi-device enclosure unit of claim 1 wherein the data-transmission-rate monitor is further to provide an administrator interface to allow administrators to configure the predefined data-transmission rate for each device or port within the multi-device enclosure.

10. A method for controlling a data-transmission rate of a device or port within a multi-device enclosure unit containing devices that include ports to connect the devices to a common backplane, the method comprising:
    at intervals of 1/n seconds during operation of the multi-device enclosure unit, invoking a monitoring component by an interval-timing component, wherein n is an integer greater than 1;
    determining, by the monitoring component, a current data-transmission rate for each device or port within the multi-device enclosure unit;
    in response to determining that the current data-transmission rate for a particular device or port within the multi-device enclosure unit exceeds a predefined data-transmission rate configured for the particular device or port, transmitting a pause command to the particular device or port; and in response to receiving a data transfer from the particular device or port, adding an amount of data transferred by the particular device or port in the data transfer to an accumulator that accumulates a total amount data transferred by the particular device or port during a current interval of time.

11. The method of claim 10 executed within a virtual-connect manager of a blade system.

12. The method of claim 10 wherein the common backplane comprises Ethernet links, and the pause command is an Ethernet pause message that includes a type/length field indicating that the message is a pause message and a pause time.

13. The method of claim 10 further including:
adding the amount of data transferred in each received data transfer from the device to one accumulator referenced by a current-accumulator reference from among n accumulators; and
at each interval, incrementing the current-accumulator reference by modulo n arithmetic and clearing the accumulator referenced by the incremented current-accumulator reference, wherein n is an integer greater than 1.

14. The method of claim 13, wherein determining the current data-transmission rate for the particular device or port comprises adding the values stored in the n accumulators.

15. The method of claim 13, wherein determining the current data-transmission rate for the particular device or port comprises adding the values stored in the n accumulators to produce a sum and by multiplying the sum by $$\frac{n}{n-1}.$$

16. The method of claim 10 further including:
when the current data-transmission rate for the particular device or port is below a first threshold, storing, in a backpressure variable, an indication that pause commands should not be sent to the particular device or port.

17. The method of claim 10 further including:
when the current data-transmission rate for the particular device or port is greater than the predefined data-transmission rate configured for the particular device or port and a value stored in a backpressure variable indicates that a pause command has not been sent to the particular device or port, sending a pause command to the particular device or port and storing an indication in the backpressure variable indicating that a pause command has been sent to the particular device or port.

* * * * *